United States Patent [19]
Yoshiyama

[11] Patent Number: 5,335,215
[45] Date of Patent: Aug. 2, 1994

[54] SEMICONDUCTOR INTEGRATED CIRCUIT FOR SIGNAL PROCESSING OF OPTICAL DISK OF WRITE-ONCE TYPE AND SEMICONDUCTOR DEVICE

[75] Inventor: Yasushi Yoshiyama, Ikeda, Japan
[73] Assignee: Ricoh Company, Ltd., Tokyo, Japan
[21] Appl. No.: 766,663
[22] Filed: Sep. 25, 1991
[30] Foreign Application Priority Data
  Sep. 30, 1990 [JP] Japan .................... 2-262009
[51] Int. Cl.⁵ .................... G11B 7/00; G11B 5/09
[52] U.S. Cl. .................... 369/50; 369/48; 369/59; 369/54; 369/124
[58] Field of Search ........... 369/47, 48, 50, 54, 369/58, 59, 124, 32; 360/77.02, 78.04, 77.05

[56] References Cited
U.S. PATENT DOCUMENTS

| | | | |
|---|---|---|---|
| 4,835,757 | 5/1989 | Abiko | 369/32 X |
| 4,896,311 | 1/1990 | Ishihara | 369/124 X |
| 5,065,388 | 11/1991 | Roth et al. | 360/72.2 |
| 5,072,435 | 12/1991 | Bakx | 369/48 |
| 5,109,369 | 4/1992 | Maeda et al. | 369/54 X |
| 5,163,035 | 11/1992 | Horikiri | 369/50 X |

Primary Examiner—W. R. Young
Assistant Examiner—Thang V. Tran
Attorney, Agent, or Firm—Cooper & Dunham

[57] ABSTRACT

A semiconductor integrated circuit for signal processing of an optical disk of a write-once type has an EFM demodulating circuit for demodulating an EFM-modulated EFM signal read out of the optical disk; an EFM modulating circuit for EFM-modulating data written to the optical disk; an ATIP demodulating circuit for demodulating an ATIP signal read out of the optical disk; a CLV control circuit for outputting a signal for controlling rotation of the optical disk based on the EFM signal or the ATIP signal; a subcord forming arithmetic circuit for extracting a subcord from the EFM signal and performing a CRC operation of the subcord, the subcord forming arithmetic circuit performing the CRC operation with respect to the data written to the optical disk and forming a subcord; a CIRC modulating/demodulating circuit for detecting and correcting an error in CIRC signal from the EFM-demodulated signal and adding a CIRC error correction code to the data written to the optical disk; an interface circuit for outputting and inputting an audio signal or data; and an interface circuit for a system controller for interfacing with a data bus of a processor for the system controller.

8 Claims, 25 Drawing Sheets

FIG. 1B

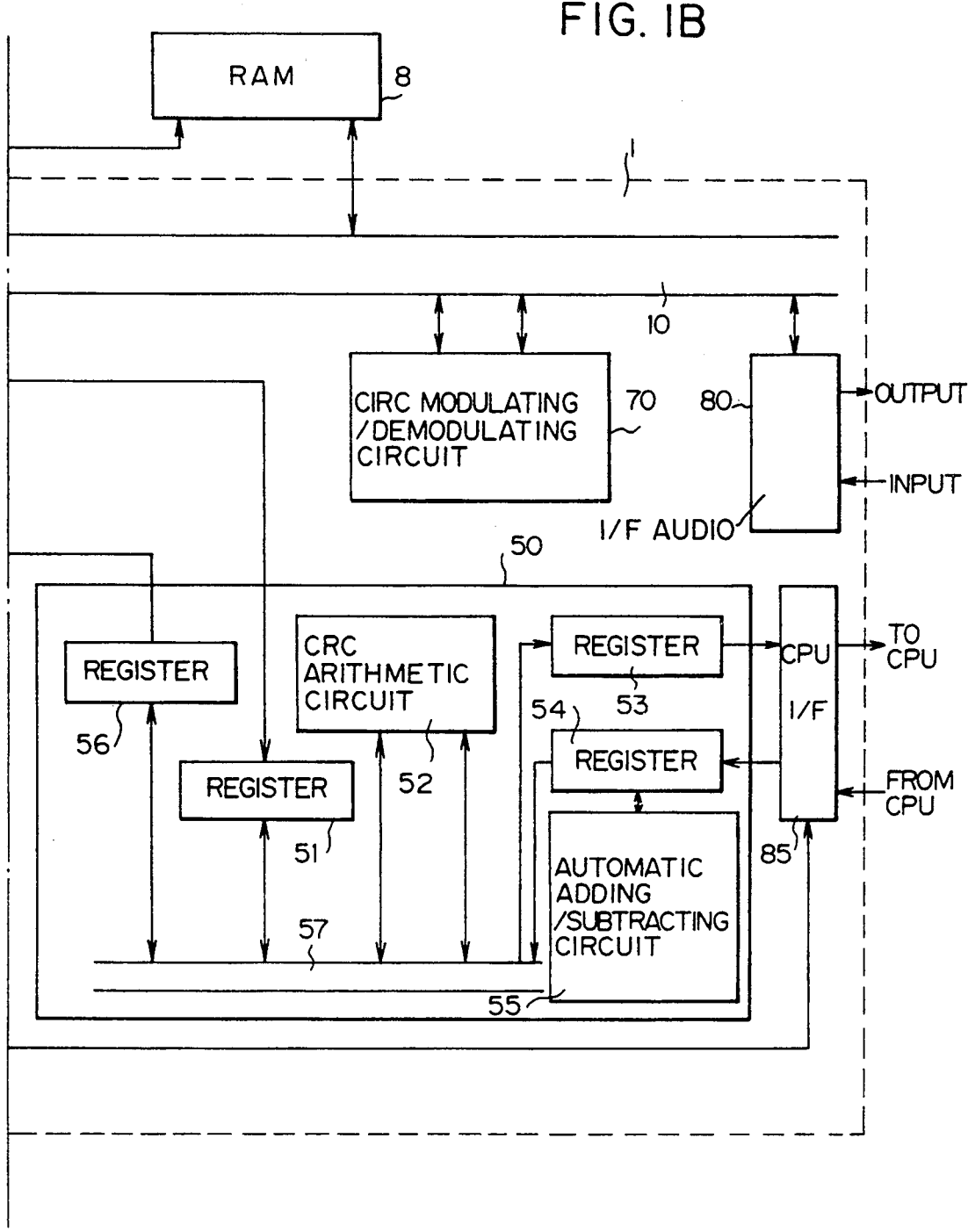

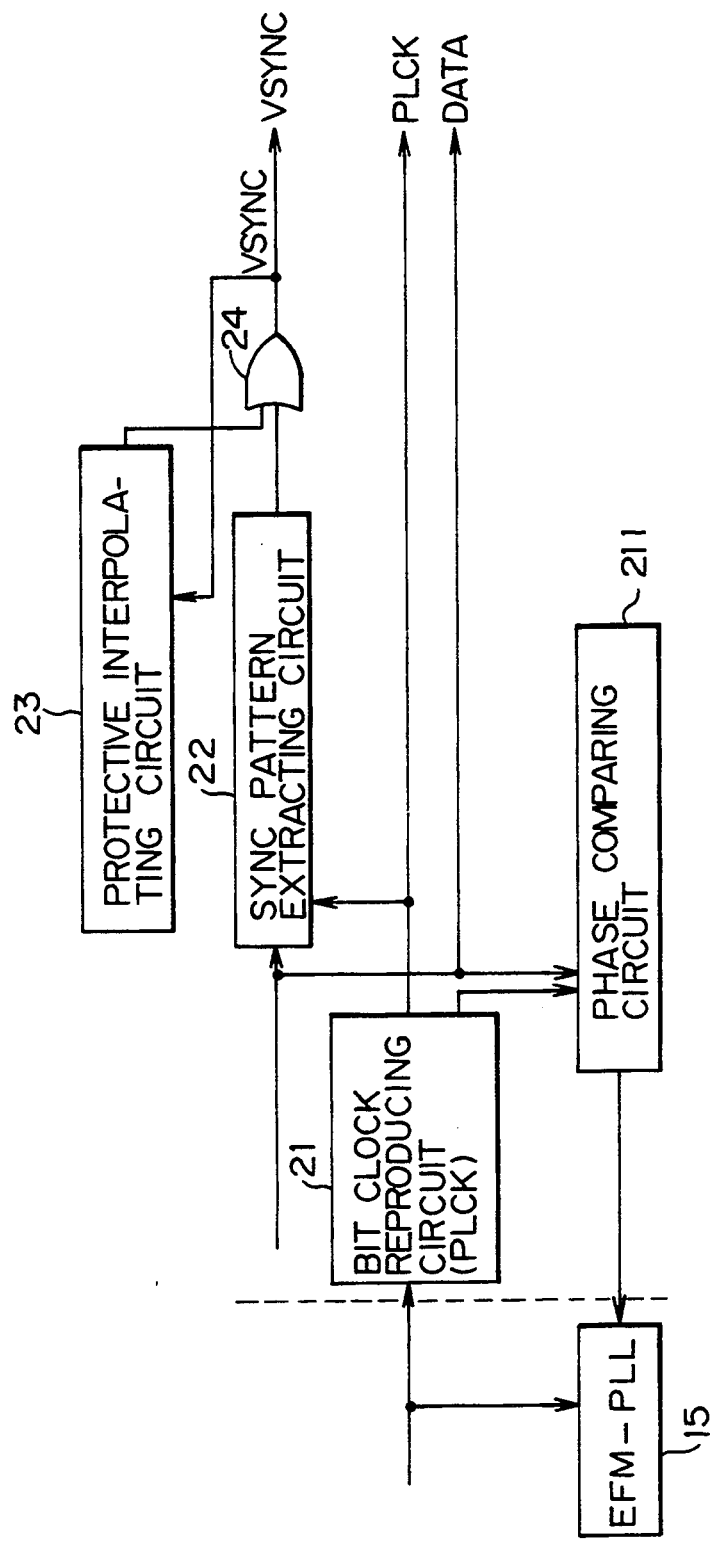

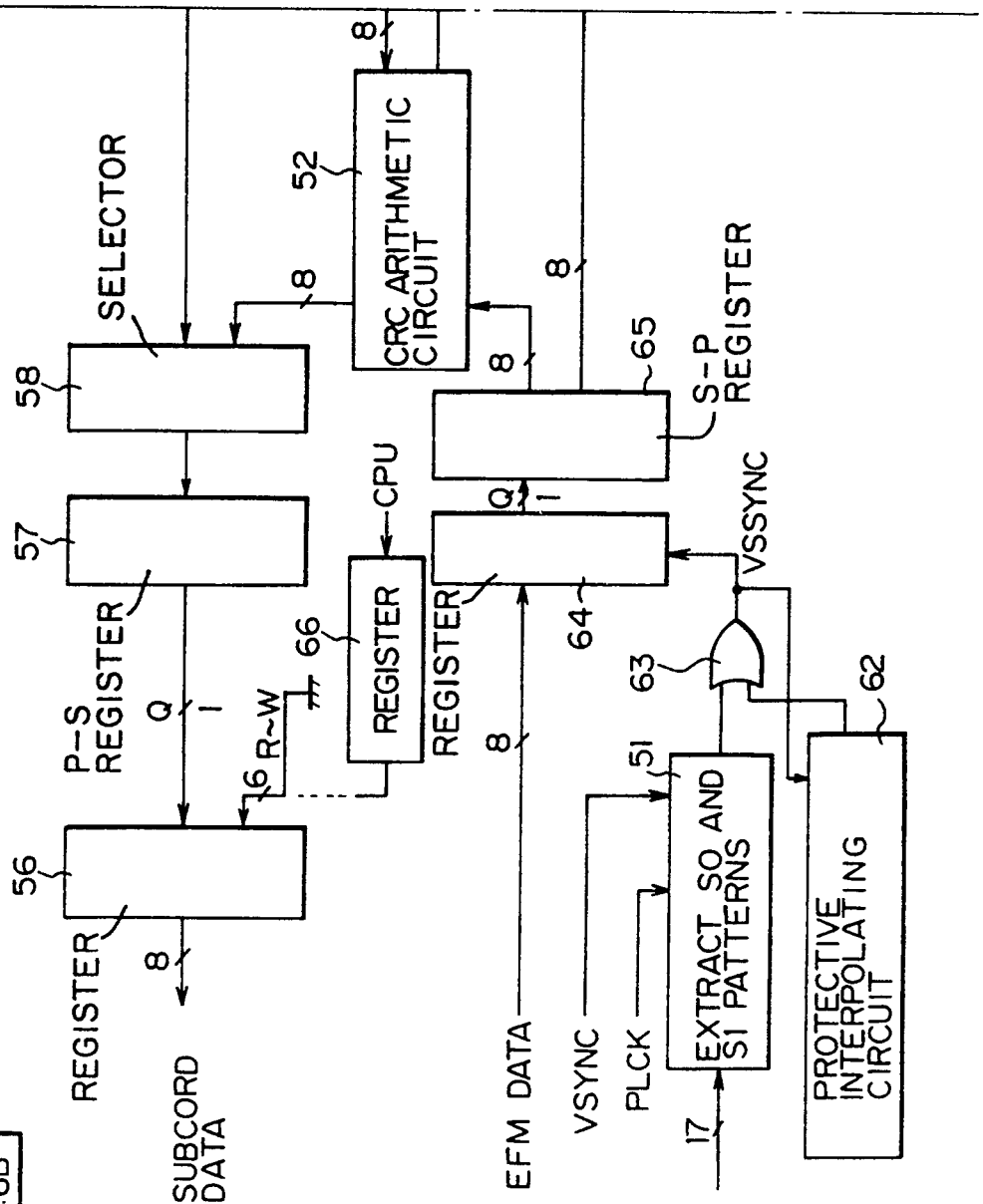

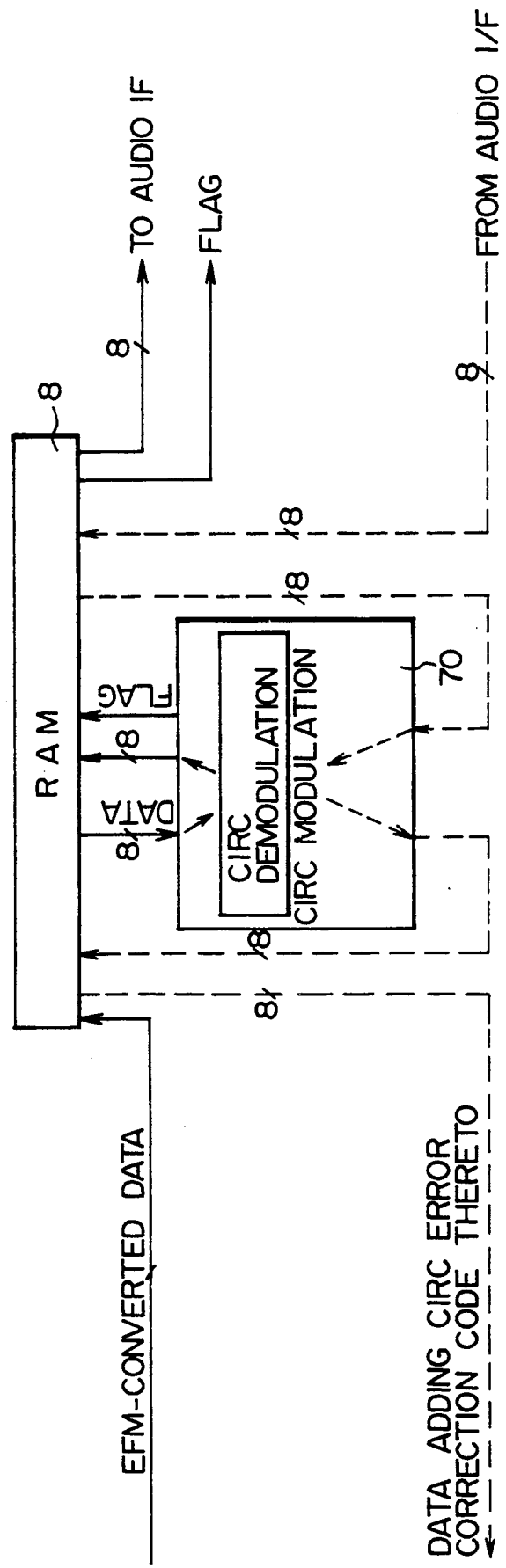

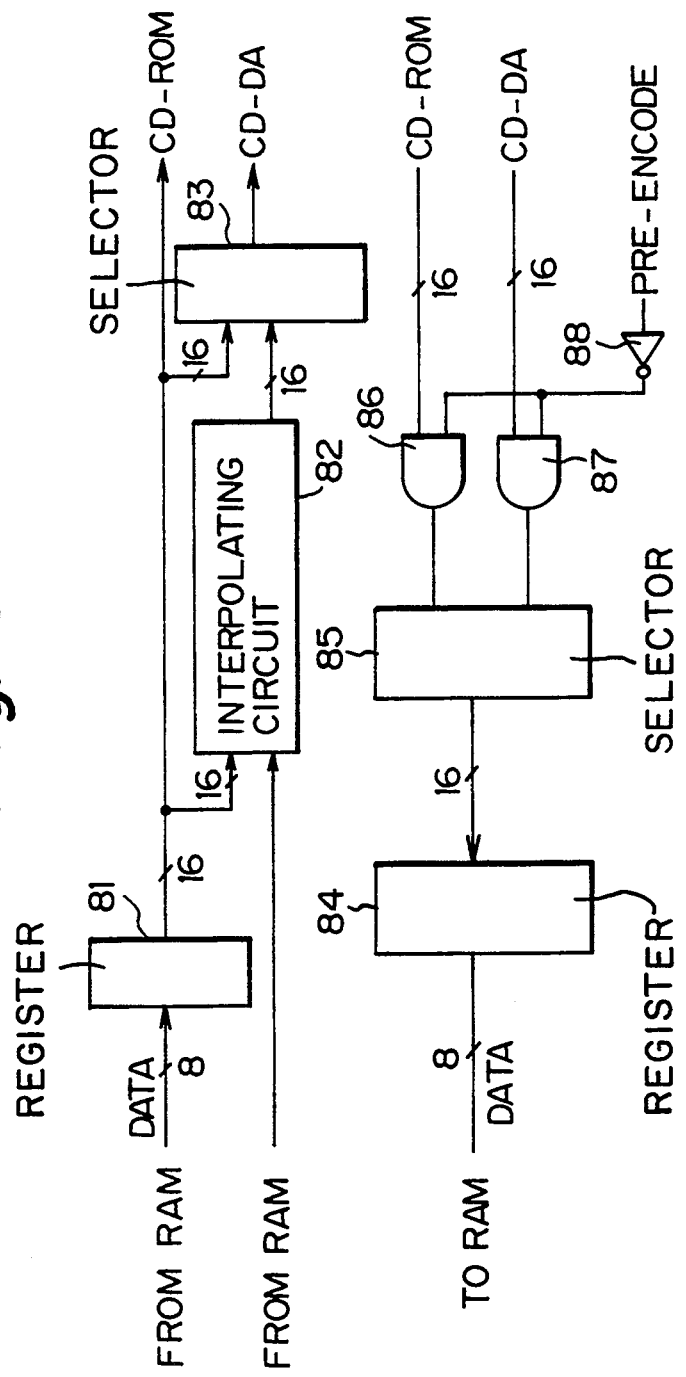

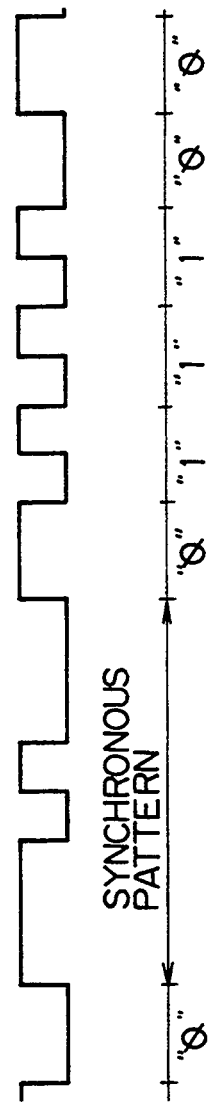
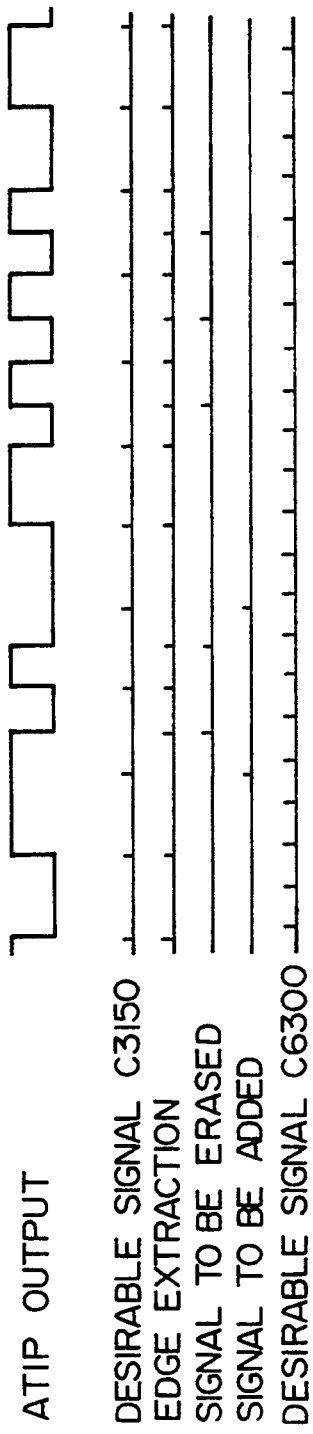

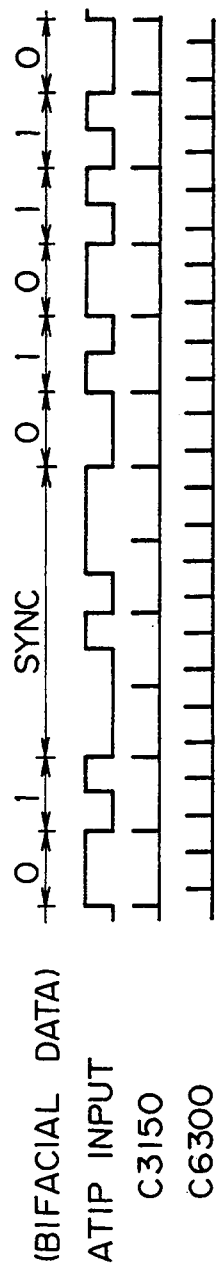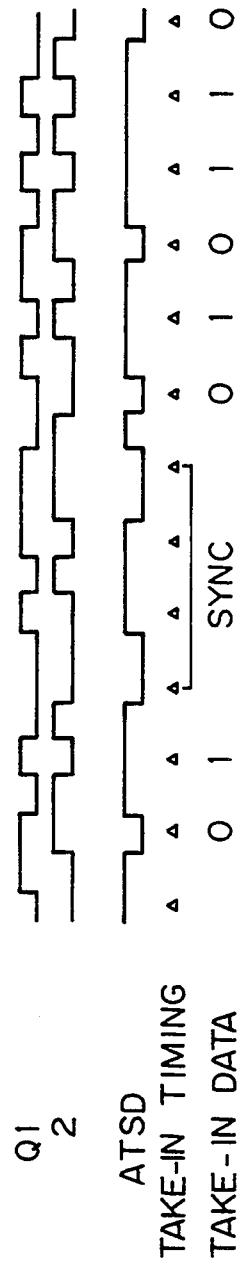
Fig. 22
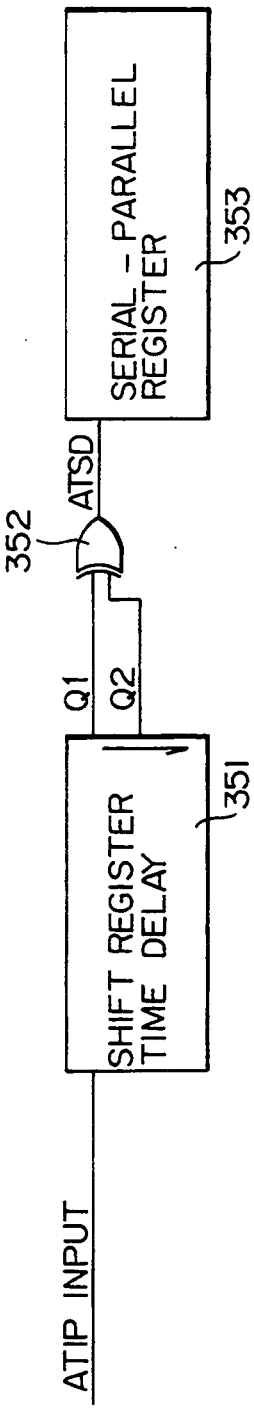
Fig. 23

SEMICONDUCTOR INTEGRATED CIRCUIT FOR SIGNAL PROCESSING OF OPTICAL DISK OF WRITE-ONCE TYPE AND SEMICONDUCTOR DEVICE

BACKGROUND OF THE INVENTION

1. Field of the Invention

The present invention relates to a semiconductor integrated circuit for processing a digital signal of an optical disk of a write-once type, i.e., a compact disk of a write-once type and a semiconductor device having this semiconductor integrated circuit. The present invention also relates to a controller for controlling rotation of the optical disk of a write-once type. Further, the present invention relates to a circuit for processing a digital signal of the optical disk of a write-once type.

2. Description of the Related Art

Recently, a compact disk for audio has been used as an optical memory medium using a laser in many cases. An analog record is being replaced with a compact disk.

In general, a so-called CD-ROM is used as a memory medium of digital data. This CD-ROM is used to record and reproduce data of a computer, etc. by utilizing a compact disk in a region of a magnetic memory used as a large capacity memory. This CD-ROM can record data of a computer, a still picture, graphs, etc., in an audio signal region while compatibility of the compact disk for audio and an audio system is held. The CD-ROM has a recordable capacity of 540M bytes. Similar to the compact disk for audio, the CD-ROM is used for a large amount of copies and wide distribution.

As mentioned above, the compact disk for audio and the CD-ROM used in electronic publication, etc. are used as the general compact disk. The compact disk for audio and the CD-ROM are of a read only memory (ROM) type for only reading, etc. A maker for manufacturing the compact disk records information onto the compact disk in advance. Many decoders and reproducing devices for reproducing this compact disk are manufactured by various kinds of makers. These reproducing devices are used for only reproduction of data and have no structure for writing data.

An optical disk of a write-once type satisfying a standard of the compact disk has been recently proposed. Further, a so-called orange book standard for making a format for recording and reproducing data with respect to this write-once type disk has been also proposed.

As mentioned above, a maker for manufacturing the compact disk generally records data onto the compact disk so that a dedicated recorder for recording these data onto the compact disk is large-sized.

Further, as mentioned above, decoders and reproducing devices for the general compact disk are used for only reproduction, etc. It is difficult to arrange the dedicated recorder used by the maker of the compact disk in the decoders and the reproducing devices for only reproduction.

In a normal compact disk (CD) drive system, the user prepares all data including data of a margin bit in advance before the disk is manufactured. These data are converted to a laser pulse and are then written to the disk. However, in a drive system of the optical disk of a write-once type such as CD-WO, the user prepares only data, and it is necessary to prepare the margin bit, etc. on a drive system side. Further, when data are written to the optical disk at the real time, it is necessary to calculate a digital sum value (DSV) every pattern bit to extremely restrain the generation of a low frequency component of a signal. Accordingly, data must be converted to a laser pulse and written to the optical disk at a high speed as much as possible.

Therefore, it is necessary to store all data for making the margin bit to a ROM and hold these data within an integrated circuit. Further, it is necessary to optimize an electric circuit combined with the integrated circuit and process these data by this electric circuit at a high speed.

SUMMARY OF THE INVENTION

It is therefore a first object of the present invention to provide a semiconductor integrated circuit which provides a so-called orange book standard for recording and reproducing data with respect to a compact disk of a write-once type and enables to easily manufacture a recording/reproducing device of the compact disk of a write-once type.

A second object of the present invention is to provide a semiconductor integrated circuit and a semiconductor device having a disk rotating controller which provides a so-called orange book standard for recording and reproducing data with respect to a compact disk of a write-once type and enables to easily manufacture a recording/reproducing device of the compact disk of a write-once type.

A third object of the present invention is to provide a semiconductor integrated circuit and a semiconductor device having a signal processing circuit which provides a so-called orange book standard for recording and reproducing data with respect to a compact disk of a write-once type and enables to easily manufacture a recording/reproducing device the compact disk of a write-once type.

In accordance with a first structure of the present invention, the above first object can be achieved by a semiconductor integrated circuit for signal processing of an optical disk of a write-once type, comprising an EFM demodulating circuit for demodulating an EFM-modulated EFM signal read out of the optical disk; an EFM modulating circuit for EFM-modulating data written to the optical disk; an ATIP demodulating circuit for demodulating an ATIP signal read out of the optical disk; a CLV control circuit for outputting a signal for controlling rotation of the optical disk based on the EFM signal or the ATIP signal; a subcord forming arithmetic circuit for extracting a subcord from the EFM signal and performing a CRC operation of the subcord, the subcord forming arithmetic circuit performing the CRC operation with respect to the data written to the optical disk and forming a subcord; a CIRC modulating/demodulating circuit for detecting and correcting an error in CIRC signal from the EFM-demodulated signal and adding a CIRC error correction code to the data written to the optical disk; an interface circuit for outputting and inputting an audio signal or data; and an interface circuit for a system controller for interfacing with a data bus of a processor for the system controller.

In accordance with a second structure of the present invention, the above first object can be achieved by a semiconductor device comprising an EFM demodulating circuit for demodulating an EFM-modulated EFM signal read out of an optical disk; an EFM modulating circuit for EFM-modulating data written to the optical disk; an ATIP demodulating circuit for demodulating an ATIP signal read out of the optical disk; a CLV control circuit for outputting a signal for controlling rotation of the optical disk based on the EFM signal or the ATIP signal; a subcord forming arithmetic circuit for extracting a subcord from the EFM signal and performing a CRC operation of the subcord, the subcord forming arithmetic circuit performing the CRC operation with respect to the data written to the optical disk and forming a subcord; a CIRC modulating/demodulating circuit for detecting and correcting an error in CIRC signal from the EFM-demodulated signal and adding a CIRC error correction code to the data written to the optical disk; an interface circuit for outputting and inputting an audio signal or data; and an interface circuit for a system controller for interfacing with a data bus to a processor for the system controller; the semiconductor device being constructed such that the respective constructional circuits are formed on the same semiconductor substrate.

As mentioned above. in the first and second structures of the present invention, the respective electric circuits have functions for performing reading and writing operations of data. Accordingly, it is possible to provide a semiconductor integrated circuit for performing the reading and writing operations. The respective electric circuits can be commonly used in the reading and writing operations so that the number of common parts of the electric circuits is increased and the size of a circuit structure is reduced. Accordingly, it is possible to easily integrate the electric circuits with each other in one chip.

To achieve the above second object, the present invention further comprises a controller for controlling the rotation of the optical disk of the write-once type. This controller comprises means for measuring the length of a top or bottom of each of patterns of a binary EFM input signal by using an internal reference clock signal; means for judging whether or not the length of the top or bottom is three to eleven times a unit length; and motor control means for decelerating the rotation of the optical disk by judging that the rotation of the optical disk is high when a signal pattern having a top or bottom having a length equal to or smaller than a length twice the unit length is detected by the judging means; the motor control means accelerating the rotation of the optical disk by judging that the rotation of the optical disk is low when the signal pattern having a top or bottom having a length equal to or greater than a length twelve times the unit length is detected by the judging means.

To achieve the above third object, the present invention further comprises a circuit for processing a signal of the optical disk of the write-once type. This signal processing circuit comprises an extracting circuit for measuring a switching edge interval of the ATIP signal read out of the optical disk by using a reference clock signal, and extracting first and second clock signals; a shift register for storing the input ATIP signal in synchronization with the second clock signal; and a judging circuit for performing an exclusive OR operation with respect to first and second outputs provided by the second clock signal from the shift register, the judging circuit judging input or output of bifacial data; the signal processing circuit being constructed such that, when two kinds of first clock signals are extracted from the extracting circuit and an incorrect first clock signal of the two first clock signals is extracted from the extracting circuit, the judging circuit returns the incorrect first clock signal to a correct clock signal.

To achieve the above third object, the present invention further comprises a signal processing circuit for writing data to the optical disk of the write-once type. This signal processing circuit comprises memory means for storing the data written to the optical disk; non-volatile memory means for storing respective predetermined parameter values corresponding to data read out of the memory means; non-volatile memory means for storing a usable pattern based on the parameter values; means for calculating a total digital counting value in a data unit; priority degree calculating means for calculating a priority degree of the pattern based on the total digital counting value in the data unit and calculated results of the calculating means; and means for selecting a single pattern to be outputted from an output of the memory means storing the pattern on the basis of an output of the priority degree calculating means.

To achieve the above third object, the present invention further comprises a signal processing circuit for adding a margin bit to the data written to the optical disk of the write-once type. This signal processing circuit comprises memory means for storing the data written to the optical disk; non-volatile memory means for storing a value provided by subtracting a value one from a length of data having the same value at an end thereof, a length value of data having the same value at a head thereof, and a total digital counting value in a data unit, in accordance with the data read out of the memory means; non-volatile memory means for storing a usable pattern based on the value provided by the subtraction and the length value of data having the same value at the head thereof; means for calculating the total digital counting value in the data unit; priority degree calculating means for calculating a priority degree of the pattern based on the total digital counting value in the data unit and calculated results of the calculating means; and means for selecting a single pattern to be outputted from an output of the memory means storing the pattern on the basis of an output of the priority degree calculating means.

In the above structures of the present invention, it is possible to provide a so-called orange book standard for recording and reproducing data with respect to the compact disk of a write-once type and easily manufacture a recording/reproducing device of the compact disk of a write-once type.

Further objects and advantages of the present invention will be apparent from the following description of the preferred embodiments of the present invention as illustrated in the accompanying drawings.

BRIEF DESCRIPTION OF THE DRAWINGS

FIGS. 2a and 2b are block diagrams showing an EFM demodulating circuit in the semiconductor integrated circuit of the present invention;

FIG. 7 is a block diagram showing a CIRC modulating/demodulating circuit in the semiconductor integrated circuit of the present invention;

FIG. 8 is a block diagram showing an interface circuit in the semiconductor integrated circuit of the present invention;

FIG. 16 is a typical view showing an example of a data waveform of the actual ATIP signal;

FIG. 17 is a waveform chart showing the relation between the ATIP signal and a data extracting signal;

FIG. 22 is a waveform chart showing the relation between respective output signals in data processing of the ATIP signal;

FIG. 23 is a block diagram showing one example of an ATIP signal processing section in the present invention;

DESCRIPTION OF THE PREFERRED EMBODIMENTS

The preferred embodiments of a semiconductor integrated circuit and a semiconductor device in the present invention will next be described in detail with reference to the accompanying drawings.

Figure 1A:
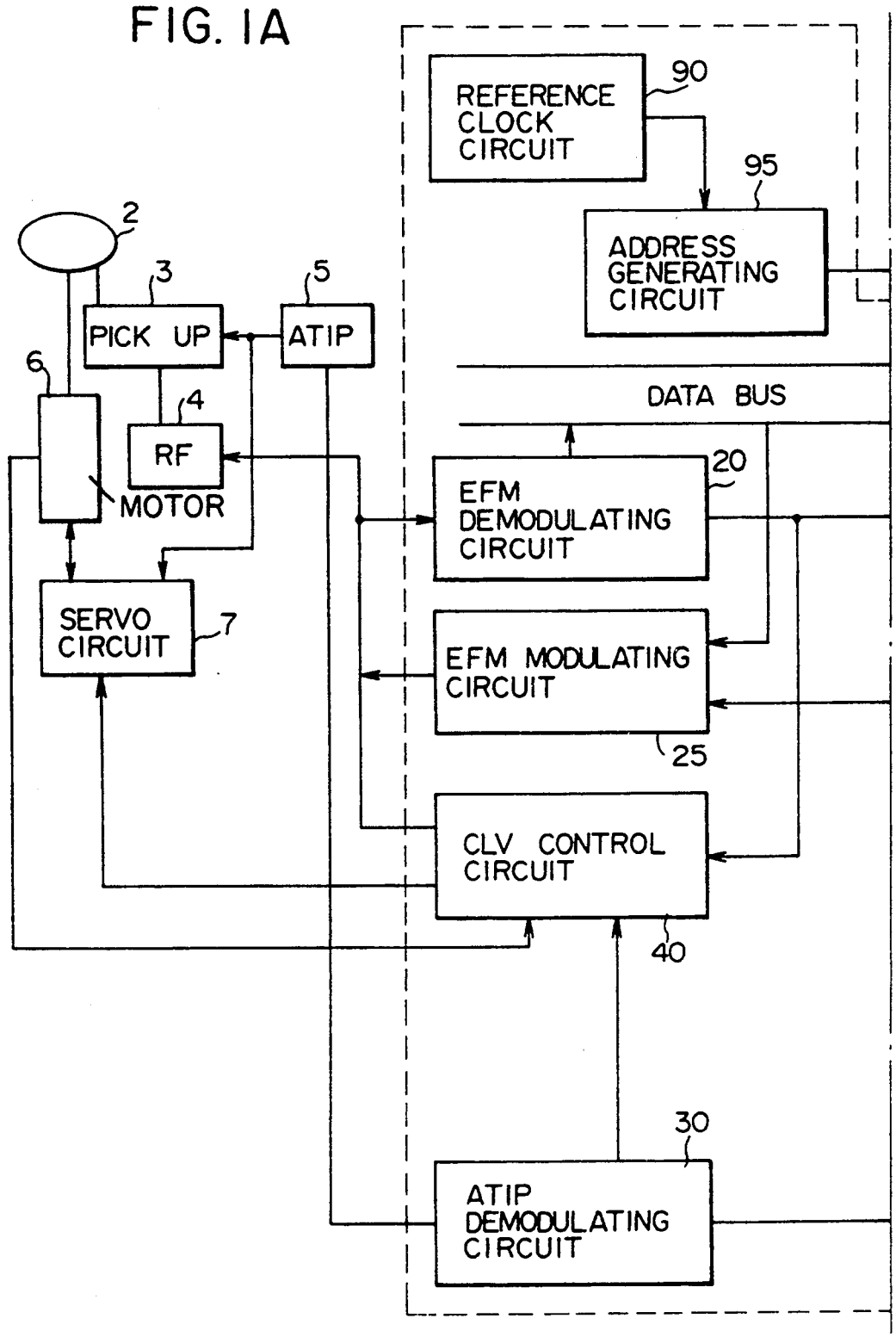
FIGS. 1 and 1(a–b) are block diagrams showing the entire construction of a semiconductor integrated circuit in accordance with one embodiment of the present invention.

FIG. 1 is a block diagram showing the entire construction of a semiconductor integrated circuit for signal processing in accordance with one embodiment of the present invention.

In FIG. 1, data are read out of an optical disk 2 of a write-once type by a pickup 3 and are inputted to a semiconductor integrated circuit 1 for signal processing from an RF circuit 4. Write data stored to a random access memory (which is briefly called RAM in the following description) 8 of a static type having an external capacity of 64 K bits are outputted to the RF circuit 4 from the semiconductor integrated circuit 1 to write the write data onto the optical disk 2.

An EFM demodulating circuit 20 demodulates an EFM-modulated EFM (Eight to Fourteen Modulation) signal of 14 bits read out of the optical disk 2 to data of 8 bits in accordance with a conversion table. The EFM demodulating circuit 20 transmits the demodulated data to a data bus 10. The demodulated data transmitted to the data bus 10 are written to the RAM 8 by assigning this RAM by an address generated from an address generating circuit 95 based on the operation of a reference clock circuit 90.

An EFM modulating circuit 25 modulates data of 8 bits read out of the RAM 8 to EFM data of 14 bits to reduce a direct current component of the data of 8 bits. The EFM modulating circuit 25 further adds data of margin bits to the modulated EFM data of 14 bits, thereby providing data of 17 bits. The EFM modulating circuit 25 then transmits the data of 17 bits to the RF circuit 4. The data read out of the RAM 8 are transmitted from the data bus 10 to the EFM modulating circuit 25. In this case, the data from the RAM 8 assigned by the address generated from the address generating circuit 95 are transmitted to tile data bus 10.

An ATIP demodulating circuit 30 demodulates an ATIP signal read out of a pre-groove made by an ATIP decoshulater 5 on the optical disk 2.

A CLV control circuit 40 outputs a signal for controlling rotation of the optical disk to a servo circuit 7 based on the EFM signal from the EFM demodulating circuit 20 and/or the ATIP signal from the ATIP decoshulater 5. An FG output from a motor 5 is inputted to the CLV control circuit 40 in this embodiment. The CLV control circuit 40 further outputs a signal for controlling the rotation of the optical disk based on this FG output.

A subcord forming arithmetic circuit 50 extracts a subcord from the EFM signal and performs a CRC operation with respect to the subcord. The subcord forming arithmetic circuit 50 further performs the CRC operation with respect to data written to the optical disk, thereby forming a subcord. The subcord forming arithmetic circuit 50 has a register 51 for inputting the EFM signal from the EFM demodulating circuit 20 and extracting a CRC signal. The subcord forming arithmetic circuit 50 further has a CRC arithmetic circuit 52, a reading register 53, a writing register 54 and an automatic adding/subtracting circuit 55. The subcord forming arithmetic circuit 50 further has an internal bus 57 and a register 56 for transmitting data to the EFM modulating circuit 25.

A CIRC modulating/demodulating circuit 70 detects an error in CIRC signal (i.e., a cross interleaved read solomon signal) from the EFM-demodulated signal read out of the RAM 8 through the data bus 10. The CIRC modulating/demodulating circuit 70 corrects this detected error and again writes corrected data to the RAM 8. Further, the CIRC modulating/demodulating circuit 70 adds a CIRC error correction code to data read out of the RAM 8 through the data bus 10 and written to the optical disk 2. The CIRC modulating-/demodulating circuit 70 again writes these data having the CIRC error correction code to the RAM 8.

An interface circuit 80 outputs an audio signal or data read out of the RAM 8 through the data bus 10. The interface circuit 80 writes an audio signal or data inputted thereto to the RAM 8.

An interface circuit 85 for a system controller interfaces with a data bus of a processor for the system controller.

The above-mentioned electric circuits will next be described in detail.

Figure 2B:
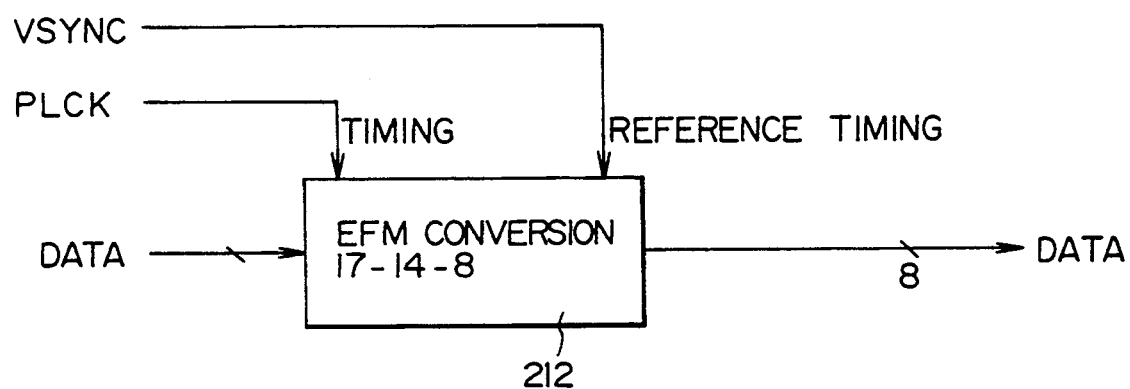

(1) The EFM demodulating circuit 20 (see FIGS. 2a and 2b)

The EFM demodulating circuit 20 has a section for inputting an EFM signal and a section for extracting EFM data. The EFM signal input section is shown in FIG. 2a. The EFM data extracting section is shown in FIG. 2b.

In FIG. 2a, an EFM-modulated EFM signal of 14 bits read out of the optical disk 2 is inputted to a SYNC pattern extracting circuit 22. A PLL section is constructed by an external PLL circuit 15, a bit clock reproducing circuit 21 and a phase comparing circuit 211. A VCO signal having 8 MHz in frequency is outputted by the bit clock reproducing circuit 21 as a bit clock signal (PLCK) having 4 MHz in frequency. This signal PLCK is transmit ted to the SYNC extracting circuit 22 as a timing signal. Portions H11, L11 and H2 of the EFM signal are extracted from this SYNC extracting circuit 22. The EFM demodulating circuit 20 has a protective interpolating circuit 23. A clock signal from the protective interpolating circuit 23 and an output signal from the SYNC extracting circuit 22 are inputted to an OR circuit 24. This OR circuit 24 outputs a synchronous signal (VSYNC). Data of the EFM signal are input ted to an EFM conversion table circuit 212. Further, the synchronous signal VSYNC and the bit clock signal PLCK are respectively inputted to the EFM conversion table circuit 212 as a reference timing signal and a timing signal. This conversion table circuit 212 removes margin bits from the above inputted data and demodulates data of 14 bits to data of 8 bits in accordance with a conversion table. The demodulated data are transmitted from the conversion table circuit 212 to the data bus 10 and are written to the RAM 8 by assigning this RAM 8 by an address generated from the address generating circuit 95 based on an operation of the reference clock circuit 90.

Figure 3A:
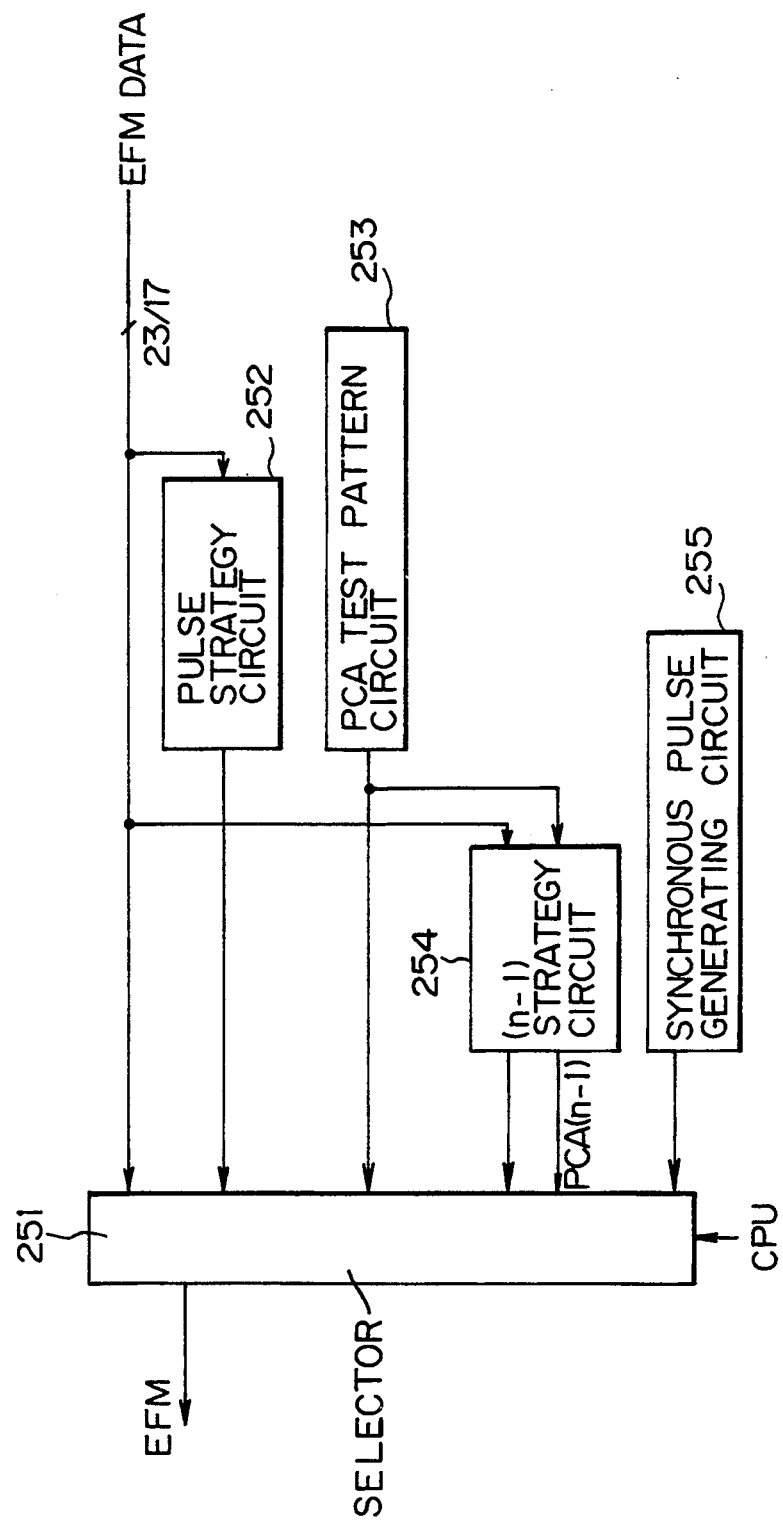
FIGS. 3a and 3b are block diagrams showing an EFM modulating circuit in the semiconductor integrated circuit of the present invention.
Figure 3B:
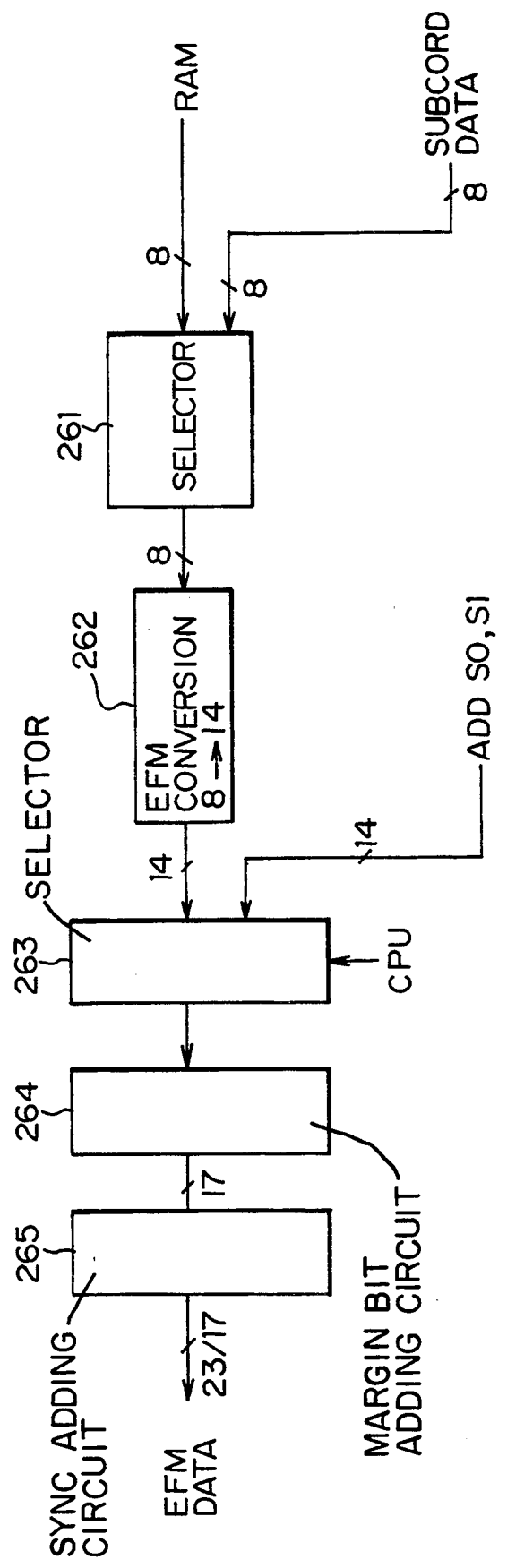

(2) The EFM modulating circuit 25 (see FIGS. 3a and 3b)

The EFM modulating circuit 25 has a section for outputting an EFM signal and a section for converting the EFM signal. The EFM output section is shown in FIG. 3a. The EFM converting section is shown in FIG. 3b.

Data of 8 bits read out of the RAM 8 and data of 8 bits from the subcord forming arithmetic circuit 50 are inputted to a selector 261 shown in FIG. 3b. The data of 8 bits are modulated to EFM data of 14 bits to reduce a direct current component of a subcord therein. Further, margin bits are added to the 14 bits so that data of 17 bits are obtained. The data of 17 bits are transmitted to the RF circuit 4. Data read out of the RAM 8 are transmitted from the data bus 10 to the EFM modulating circuit 25. In FIG. 3b, the selector 261 selects subcord data or the data from the RAM 8 and outputs the selected data to an EFM converting circuit 262. The EFM converting circuit 262 converts the data of 8 bits to an EFM signal of 14 bits in accordance with a conversion table and outputs the converted EFM signal to a selector 263. Data of 14 bits for adding signals S0 and S1 are inputted to the selector 263. The selector 263 transmits the EFM signal or the signals S1, S0 to a margin bit adding circuit 264 based on a control signal from a central processing unit (CPU). The margin bit adding circuit 264 adds data of margin bits to the data of the 14 bits and outputs a signal of 17 bits. The margin bit adding circuit 264 is constructed by a ROM or a logic array storing values J, K and V (described in detail later) corresponding to the respective data. This margin bit adding circuit 264 constitutes a ROM or a logic array showing a usable pattern based on the values J and K. The margin bit adding circuit 264 has a circuit for calculating a digital sum value (DSV) described in detail later and has a circuit showing a priority order of the pattern based on the values V and DSV and selecting a single pattern to be outputted.

In the above margin bit adding circuit 264, when the margin bits are added to the data of 14 bits, the above values are calculated on the basis of a preset rule in all cases and the calculated results are held within a chip of a ROM or a logic array circuit, etc., thereby operating the semiconductor integrated circuit at a high speed. Accordingly, it is possible to perform a writing operation of the optical disk of a write-once type at a high speed.

The data having the margin b its added by the margin bit adding circuit 264 are outputted to a SYNC adding circuit 265. This SYNC adding circuit 265 further adds data of 7 bits to the data having the margin bits only in the case of a SYNC signal and outputs the added data.

The SYNC adding circuit 265 transmits EFM data of 17 bits or 23 bits (only in the case of the SYNC signal) to a selector circuit 251, a pulse strategy circuit 252, and an (n−1) strategy circuit 254. The pulse strategy circuit 252 changes the EFM data to values A, B and C based on the contents of a blue book and outputs these values to the selector 251. The (n−1) strategy circuit 254 performs (n−1) strategic processing with respect to the EFM data and transmits the processed results to the selector 251. The selector 251 inputs an output of a test pattern circuit 253 for performing a standard test. The selector 251 also inputs an output of a synchronous pulse generating circuit 255 for destroying data written once by writing data twice. This selector 251 selects one of the above electric signals inputted thereto on the basis of a control signal from the central processing unit (CPU) and outputs the selected signal. Data of this selected signal are outputted to the RF circuit 4 and are written onto the optical disk by the pickup 3.

Figure 4A:
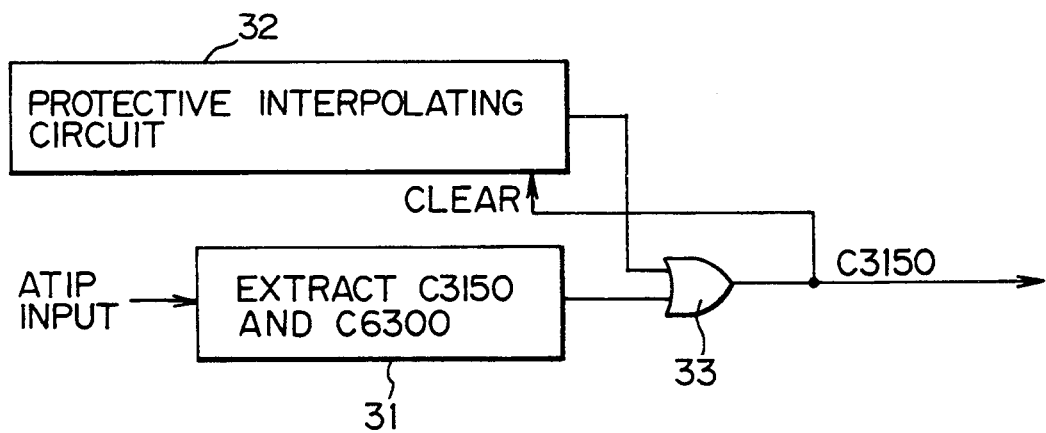
FIGS. 4a and 4b are block diagrams showing an ATIP demodulating circuit in the semiconductor integrated circuit of the present invention.
Figure 4B:
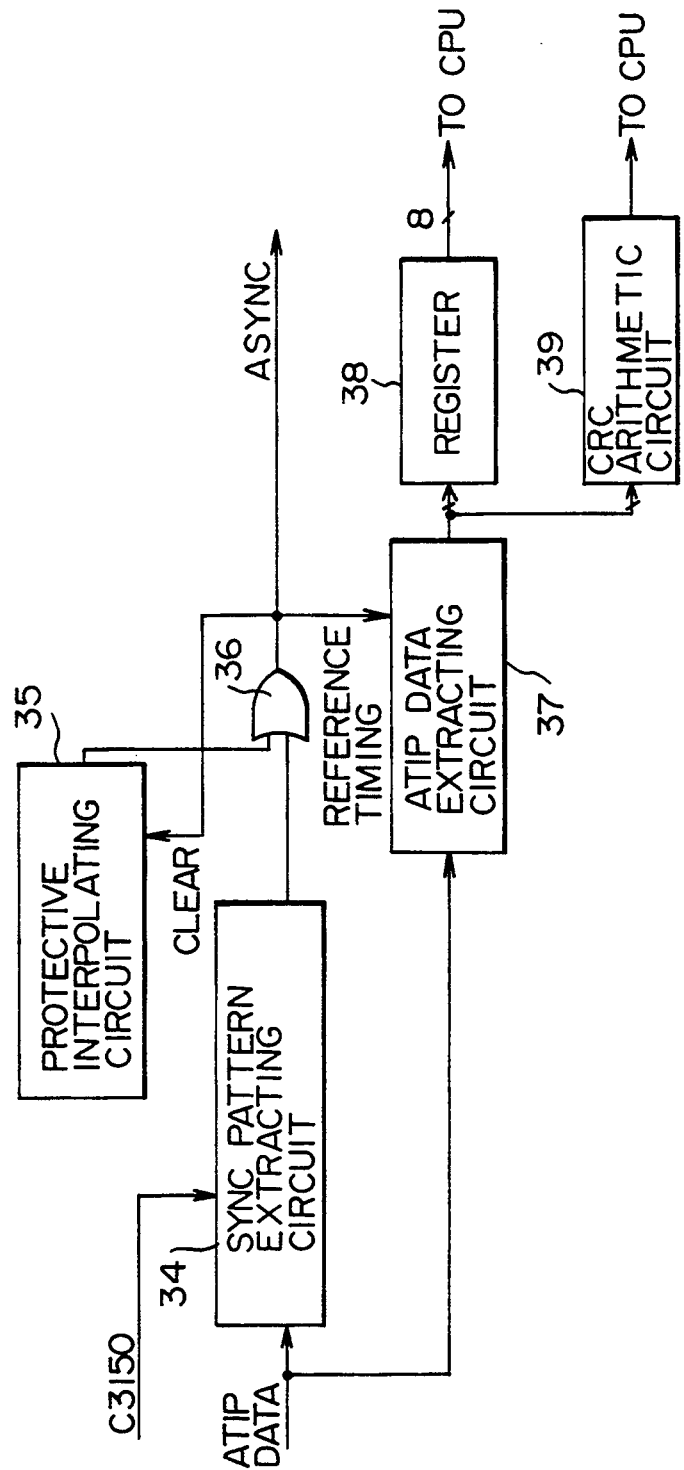

(3) The ATIP demodulating circuit 30 (see FIGS. 4a and 4b)

The ATIP demodulating circuit 30 has a section for inputting an ATIP signal and a section for processing the ATIP signal. The ATIP input section is shown in FIG. 4a. The ATIP signal processing section is shown in FIG. 4b.

The ATIP signal is read out of a pre-groove formed on the optical disk 2 by the ATIP decoshulater 5. The ATIP signal is then inputted to a C3150, C6300 extracting circuit 31. This extracting circuit 31 outputs a signal C3150 to an OR circuit 33 as a basic timing signal. This OR circuit 33 also inputs an output of a protective interpolating circuit 32 and outputs the signal C3150 as a take-in timing signal to a SYNC pattern extracting circuit 34 shown in FIG. 4b. ATIP data are inputted to the SYNC pattern extracting circuit 34. The SYNC pattern extracting circuit 34 outputs a bit clock signal to an OR circuit 36. An output of a protective interpolating circuit 35 is inputted to the OR circuit 36 and this OR circuit 36 outputs a timing signal (ASYNC).

The ATIP data are also inputted to an ATIP data extracting circuit 37. The timing signal ASYNC is provided as a basic timing signal in this ATIP data extracting circuit 37. An output of the ATIP data extracting circuit 37 is transmitted to a register 38 and a CRC arithmetic circuit 39 as data of 8 bits. The register 38 transmits the data of 8 bits to the central processing unit (CPU). The CRC arithmetic circuit 39 transmits the detecting results of an error in data of 8 bits to the central processing unit (CPU).

Figure 5:
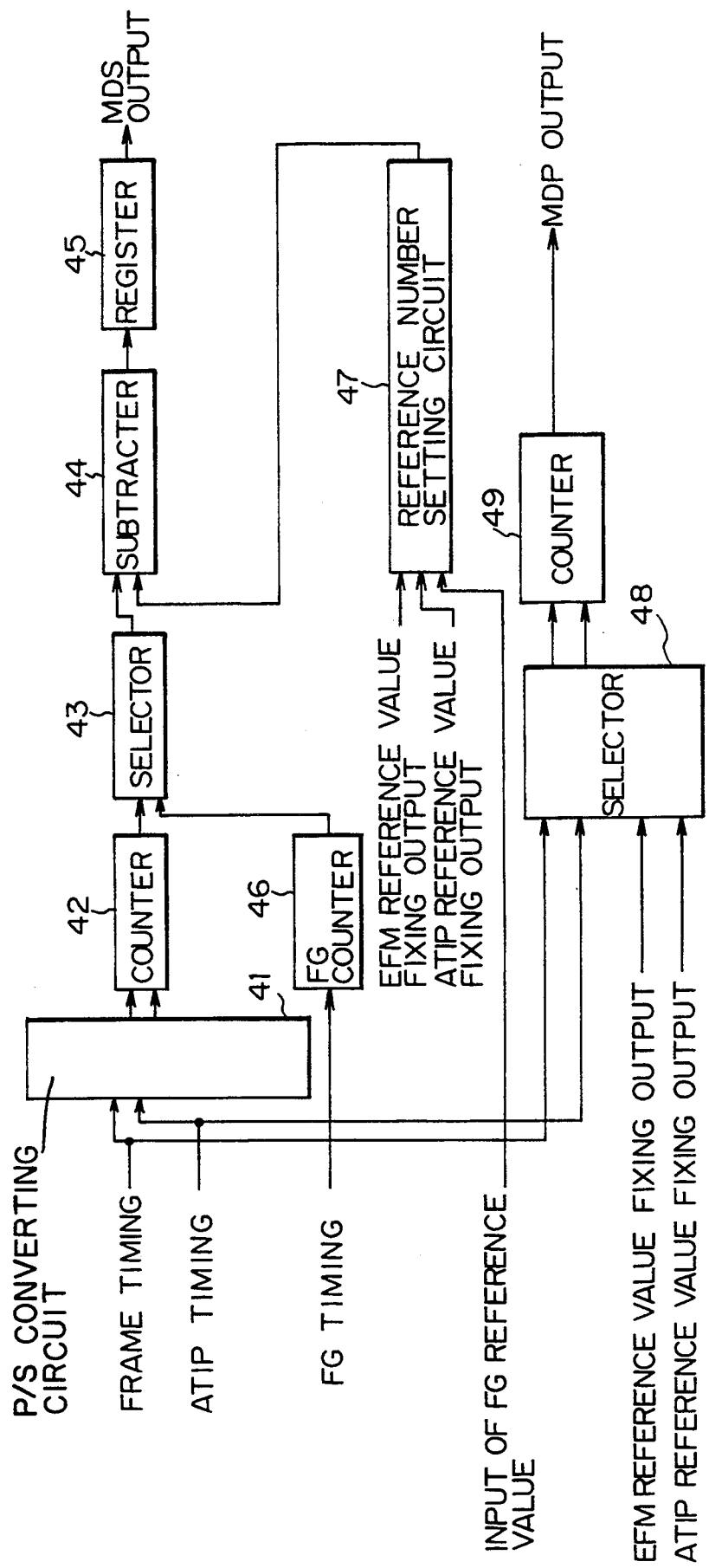
FIG. 5 is a block diagram showing a CLV control circuit in the semiconductor integrated circuit of the present invention.

(4) The CLV control circuit 40 (see FIG. 5)

An EFM frame timing signal and an ATIP timing signal are inputted from the EFM demodulating circuit 20 to a counter 42 through a parallel-serial converting circuit 41. The EFM frame timing signal and the ATIP timing signal are also outputted to a selector 48. The counter 42 outputs a speed differential control signal with respect to these timing signals to a selector 43. An FG output from the motor 6 is transmitted to an FG counter 45 and an output of this FG counter 46 is transmitted to the selector 43. An EFM reference value fixing output, an ATIP reference value fixing output and an FG reference value are respectively provided in a reference number setting circuit 47. An output of this reference number setting circuit 47 is transmitted to a subtracter 44. An output of the selector 43 is also transmitted to the subtracter 44. This subtracter 44 outputs a signal (MDS) for controlling the rotation of the optical disk to the servo circuit 7 through a register 45. The selector 48 outputs a signal for phase differential control to an updown counter 49. This updown counter 49 outputs a phase control signal (MDP).

In an operation of the CLV control circuit 40, servo control is performed in accordance with an EFM pit on the optical disk at a reading time of data. At a writing time of data, servo control is performed in accordance with a pregroove formed on the optical disk. These servo controls are performed by the same electric circuit.

Figure 6B:
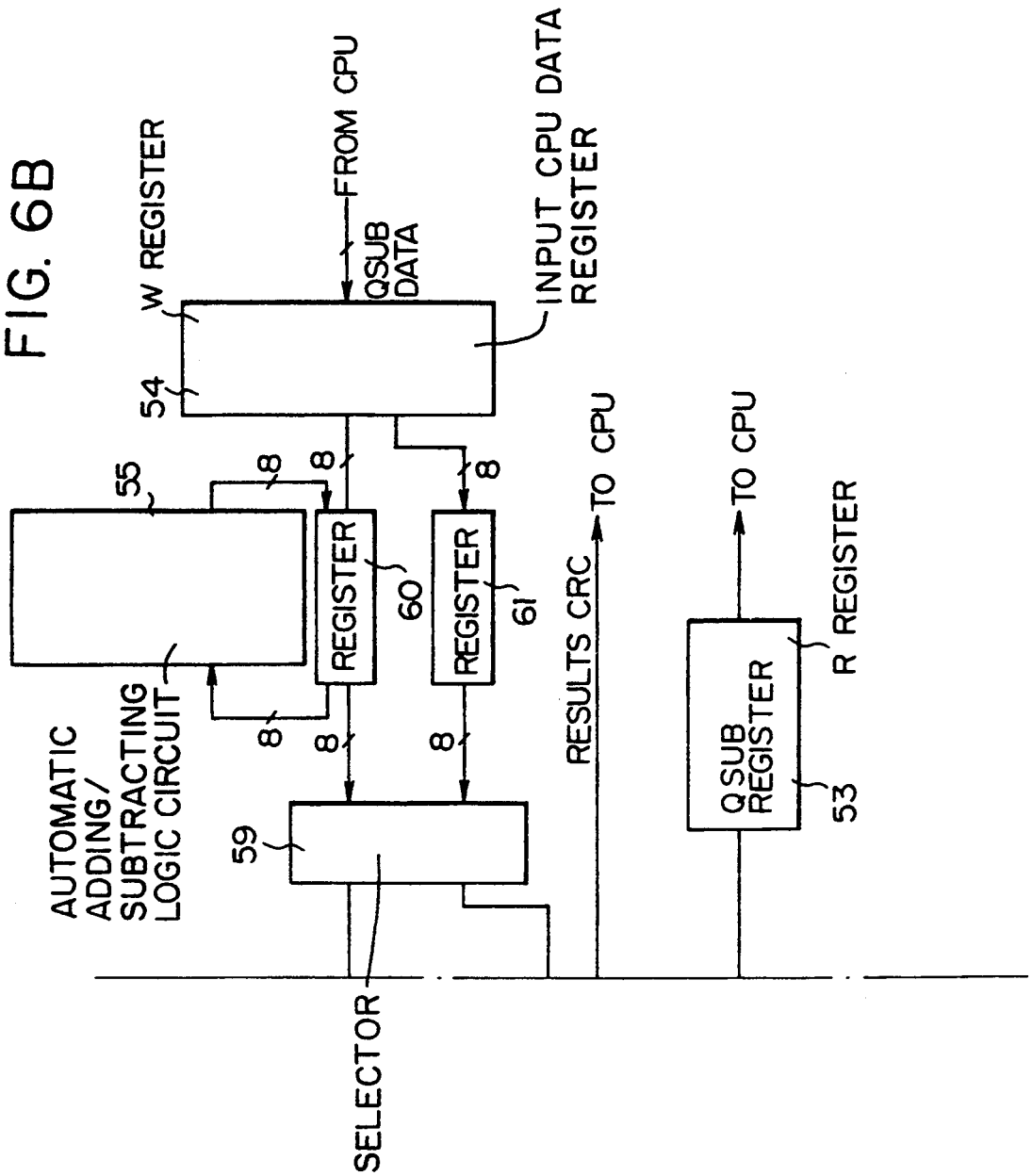
FIGS. 6 and 6(a-b) are block diagrams showing a subcord forming arithmetic circuit in the semiconductor integrated circuit of the present invention.

(5) The subcord forming arithmetic circuit 50 (see FIG. 6)

The EFM signal from the EFM demodulating circuit 20 is inputted to a register 51 for extracting a CRC signal in the subcord forming arithmetic circuit 50. This register 51 outputs the extracted signal to an OR circuit 63. An output of a protective interpolating circuit 62 is transmitted to this OR circuit 63. This OR circuit 53 outputs a VSSYNC signal to a register 64 as a take-in timing signal. EFM data are also inputted to the register 64. This register 54 outputs a Q-output to a serial-parallel converting circuit 65. This serial-parallel converting circuit 55 transmits data of 8 bits to a CRC arithmetic circuit 52 and a reading register 53. The CRC arithmetic circuit 52 outputs the results of a CRC operation with respect to the data of 8 bits to the central processing unit (CPU). The reading register 53 outputs read data to the central processing unit (CPU).

Q-subdata are transmitted to a writing register 54 from the central processing unit (CPU). This writing register 54 outputs these data to an automatic adding-/subtracting circuit 55 and registers 60 and 61. The automatic adding/subtracting circuit 55 and the register 60 perform automatic adding and subtracting operations with respect to time information of the Q-subcord. The register 60 outputs a value indicative of the automatic adding/subtracting results to a selector 59. Data of the register 61 are also transmitted to the selector 59. The selector 59 selects signals from the registers 60 and 61 and outputs a selected signal to the CRC arithmetic circuit 52 and a selector 58. The CRC arithmetic circuit 52 performs the CRC operation with respect to the inputted data for writing and outputs data obtained by this CRC operation to the selector 58. The selector 58 transmits output data thereof to a parallel-serial converting circuit 57. The parallel-serial converting circuit 57 transmits serially converted Q-data to a register 56. This register 56 outputs subcord data.

(6) The CIRC modulating/demodulating circuit 70 (see FIG. 7)

The CIRC modulating/demodulating circuit 70 detects an error in CIRC signal from an EFM-demodulated signal read out of the RAM 8 through the data bus 10. The CIRC modulating/demodulating circuit 70 then corrects this error and writes corrected data to the RAM 8 again. Further, the CIRC modulating/demodulating circuit 70 adds a CIRC error correction code to data read out of the RAM 8 through the data bus 10 and written to the optical disk 2. The CIRC modulating/demodulating circuit 70 then writes these added data to the RAM 8 again.

(8) The interface circuit 80 (see FIG. 8)

Data from the RAM 8 are transmitted to a register 81 and an interpolating circuit 82. The register 81 transmits data of 15 bits to the interpolating circuit 82. The interpolating circuit 82 holds these data and interpolates an average value thereof and outputs interpolated data to a selector 83. An output of the register 81 is inputted to the selector 83. This selector 83 outputs data for CD-DA. The register 81 outputs data for CD-ROM.

The data for CD-ROM and CD-DA are respectively transmitted to AND circuits 86 and 87. Pre-encoding data are transmitted to these AND circuits 85 and 87 through a NOT circuit 88. Output data of the AND circuits 86 and 87 are transmitted to a selector 85. Output data of this selector 85 are written to the RAM 8 through a register 84.

As mentioned above, in the above embodiment of the present invention, the respective electric circuits have functions for performing reading and writing operations of data. Accordingly, it is possible to provide a semiconductor integrated circuit for performing the reading and writing operations. The respective electric circuits can be commonly used in the reading and writing operations so that the number of common parts of the electric circuits is increased and the size of a circuit structure is reduced. Accordingly, it is possible to easily intograft the electric circuits with each other in one chip.

(2a) The EFM modulating circuit 25 will be further described in detail with reference to FIGS. 3a and 3b and FIGS. 9 to 12. This item (2a) corresponds to the above-mentioned item (2).

Figure 10:
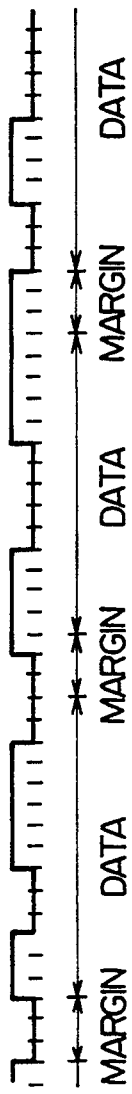
FIG. 10 is a typical view showing a data construction of an EFM modulating system.

An EFM converting system is used in a compact disk (CD) system to record data on the optical disk 2. Accordingly, for example, when all data show value "0", it is possible to prevent the generation of a state in which there is no pit on the optical disk 2. Namely, as shown in FIG. 10, hexadecimal data of 8 bits are converted to a pattern having a predetermined 14 bit length and a margin bit portion of three bits is then added to this pattern, thereby constituting data of one byte recorded onto the optical disk 2. In the EFM converting system, high and low states of this pattern have no meaning and only the length of a top or bottom of this pattern has a meaning.

Further, a "3T–11T rule" exists in this EFM converting system. In this rule, the length of the top or bottom of the above pattern must be set to be three to eleven times a unit length. The formation of the top or bottom of the pattern including a margin bit and having a length equal to or smaller than 2T is inhibited. Further, the formation of the top or bottom of the pattern including the margin bit and having a length equal to or greater than 12T is inhibited. Therefore, the margin bit between two data has a limited pattern.

Figure 11A:
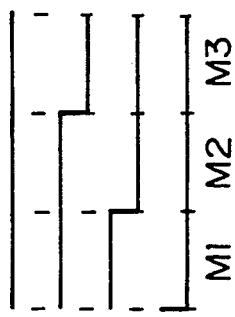
FIGS. 11a and 11b are typical views showing data constructions of margin bits in the EFM modulating system.
Figure 11B:
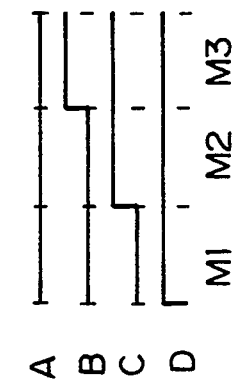

FIGS. 11a and 11b show allowable patterns of the margin bit. In FIG. 11a, an end of a just-before data pattern shows value "0". In FIG. 11b, an end of the just-before data pattern shows value "1".

In the EFM conversion, a digital sum value (DSV) is used to restrain the generation of a low frequency component of a signal as much as possible. The margin bit pattern is also limited by this digital sum value. The digital sum value (DSV) is used to balance the top length of the pattern at an interval as short as possible. The digital sum value is calculated on occasion every pattern bit and is set to a value close to value "0" as much as possible by adjusting the margin bit.

In the normal compact disk (CD) drive system, a user prepares all data including data the margin bit in advance before the disk is manufactured. These data are converted to a laser pulse and are then written to the disk. However, in a drive system of the optical disk of a write-once type such as CD-WO, the user prepares only data, and it is necessary to prepare the margin bit, etc. on a drive system side. Further, when data are written to the optical disk at the real time, it is necessary to calculate the digital sum value (DSV) every pattern bit. Accordingly, data must be converted to a laser pulse and written to the optical disk at a high speed as much as possible.

Therefore, it is necessary to store all data for making the margin bit to a ROM and hold these data within an integrated circuit. Further, it is necessary to optimize an electric circuit combined with the integrated circuit and process these data by this electric circuit at a high speed. The EFM modulating circuit 25 in this embodiment is constructed such that this EFM modulating circuit 25 satisfies the above requirements.

Figure 9:
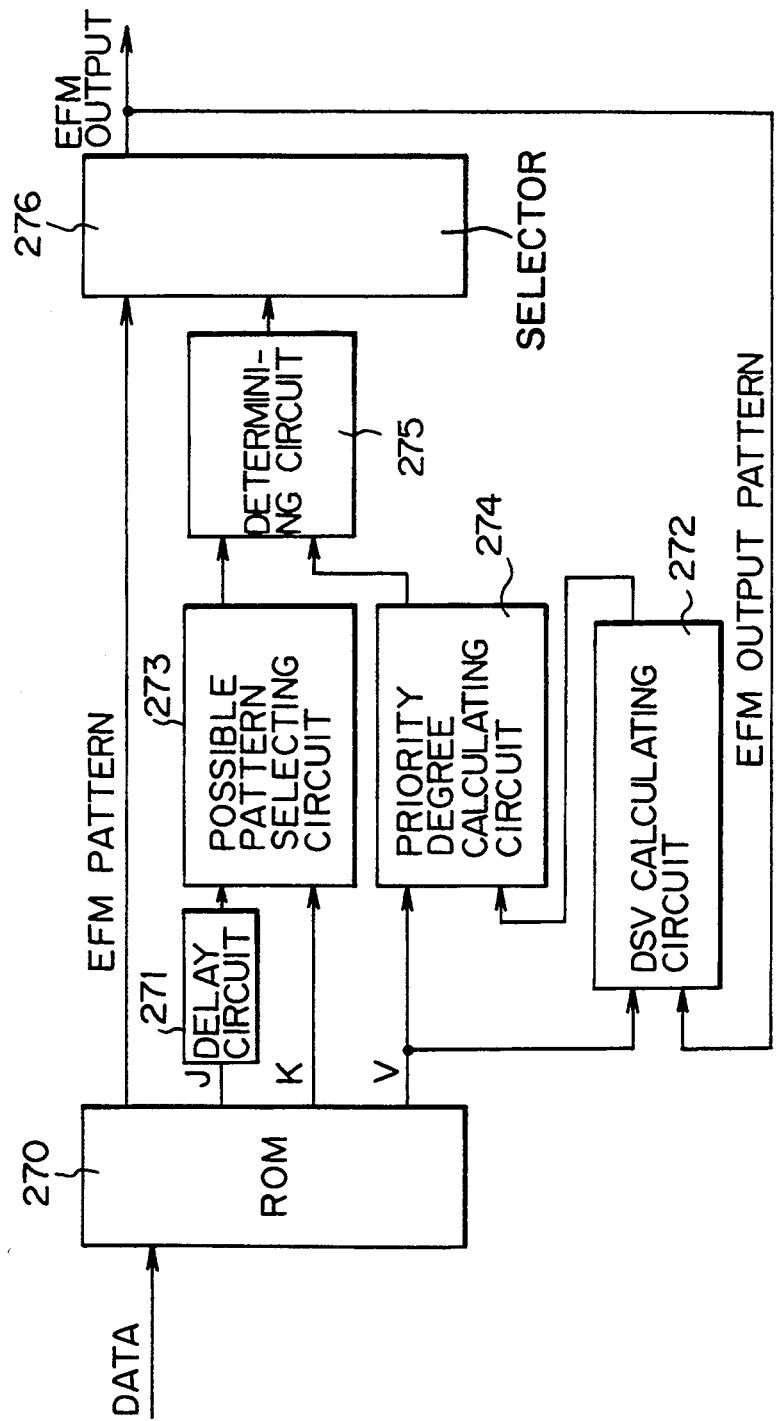
FIG. 9 is a block diagram showing concrete examples of an EFM converting circuit and a margin bit adding circuit in the EFM modulating circuit in the present invention.

FIG. 9 is a circuit diagram showing concrete examples of the EFM converting circuit 262 and the margin bit adding circuit 264 shown in FIG. 3b.

In FIG. 9, a ROM 270 stores values J, K and V corresponding to respective bit data and stores a conversion table for converting hexadecimal data of 8 bits to an EFM signal corresponding to these hexadecimal data.

The value J stored to the ROM 270 is equal to a value provided by subtracting value one from the length of a data end continuously showing the same value. The value K stored to the ROM 270 is equal to the length of a data head continuously showing the same value. The value V stored to the ROM 270 is a value indicative of the digital sum value (DSV) in a data unit.

Figure 12:
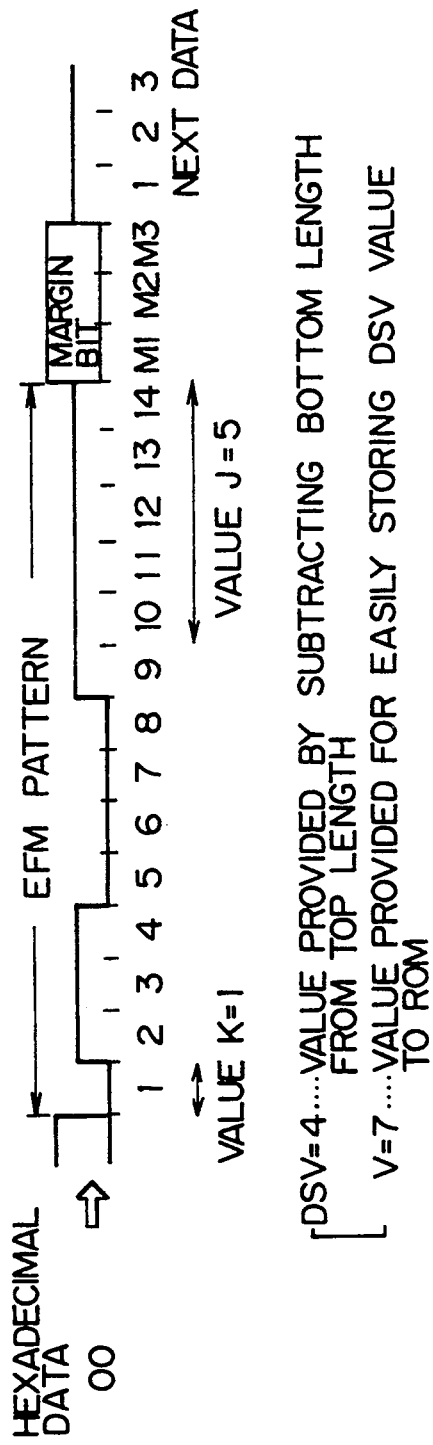
FIG. 12 is a typical view showing a data construction of the EFM modulating system.

As shown in FIG. 12, the value V is not equal to the digital sum value (DSV) with respect to the above data as it is. The digital sum value (DSV) is set to one of nine values composed of −8, −6, −4, −2, 0, 2, 4, 6 and 8. Accordingly, the value V has an allocated number easily stored to the ROM 270 in consideration of these limited nine values.

As mentioned above, the margin bit is made in accordance with the following two rules.
 (i) 3T–11T rule
 (ii) A minimum value of the digital sum value (DSV) is set to a value close to value "0" so as to restrain the low frequency component of a signal.

The EFM modulating circuit 25 is constructed such that these two rules are satisfied.

Data of the value J outputted from the ROM 270 are delayed by a delay circuit 271. The value J located by one before the value J of the delayed data is transmitted to a possible pattern selecting circuit 273. Further, the value K outputted from the ROM 270 is transmitted to the possible pattern selecting circuit 273. This possible pattern selecting circuit 273 limits a possible pattern to be selected in accordance with the above rule (i) and outputs data of this limited pattern to a determining circuit 275.

The value V outputted from the ROM 270 is transmitted to a priority degree calculating circuit 274 and a DSV calculating circuit 272. The priority degree calculating circuit 274 provides a priority order of data under a condition for providing the minimum value of the digital sum value (DSV) in accordance with the above rule (ii). The priority degree calculating circuit 274 then transmits data about this priority order to the determining circuit 275. The determining circuit 275 selects a single margin bit pattern by a best margin bit pattern at this time and the data in the priority order. The determining circuit 275 then outputs this selected margin bit pattern to a selector 276. An EFM pattern from the ROM 270 is also transmitted to this selector 276. The selector 276 adds the above selected margin bit pattern to a rear end of this EFM pattern and outputs this added EFM pattern.

Each of patterns is fed back to the DSV calculating circuit 272 to calculate the digital sum value (DSV).

In the EFM converting circuit and the margin bit adding circuit mentioned above, when the margin bit is added, the priority degree of data is calculated on the basis of a preset rule in all cases and the calculated results thereof are held within a chip of the ROM 270, thereby operating the semiconductor integrated circuit at a high speed. Accordingly, it is possible to perform a writing operation of the optical disk of a write-once type at a high speed.

In the above embodiment, a logic array circuit, etc. may be used instead of the ROM 270.

(3a) The ATIP demodulating circuit 30 will be further described in detail with reference to FIGS. 4a and 4b and FIGS. 13 to 25.

This item (3a) corresponds to the abovementioned item (3).

Figure 13:
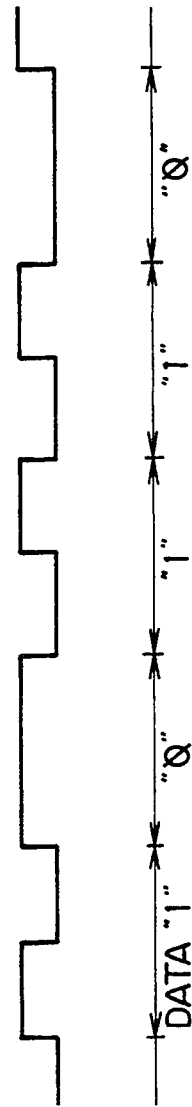
FIG. 13 is a typical view showing a data construction of an ATIP pre-groove signal.

An ATIP pre-groove is formed on the optical disk of a write-once type such as CD-WO to output position information of an EFM pit before this EFM pit is formed. As shown in FIG. 13, data of 42 bits are stored to this ATIP pregroove in a bifacial form. In a digital notation of the bifacial form, data value "1" is provided for a certain unit time when high and low voltage levels of a data signal are switched. Further, in this digital notation, data value "0" is provided for the certain unit time when no high and low voltage levels of the data signal are switched.

Figure 14:
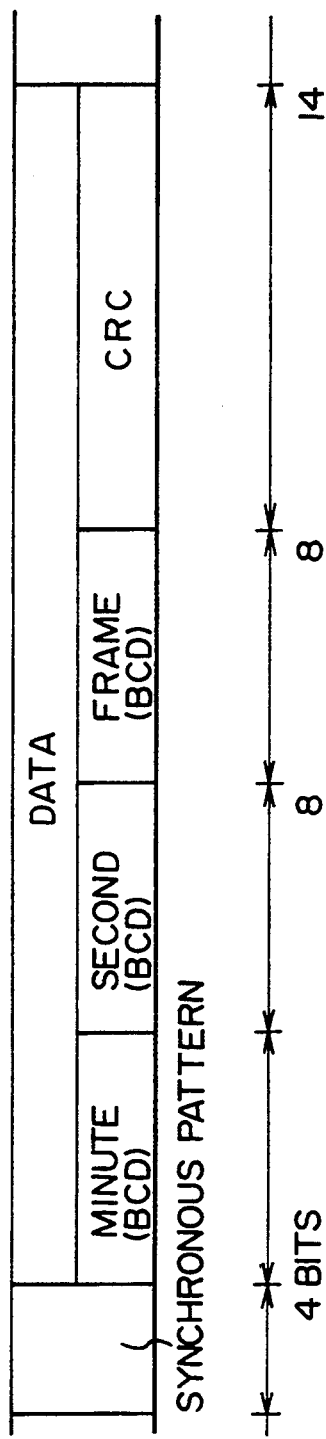
FIG. 14 is a typical view showing a data construction of an ATIP signal.

As shown in FIG. 14, ATIP data are constructed by data of a total of 42 bits composed of data of a synchronous pattern of 4 bits, data of time information of 8 bits with respect to each of a minute (BCD), a second (BCD) and a frame (BCD), and CRC data of 14 bits in relation to the time information data.

Figure 15:
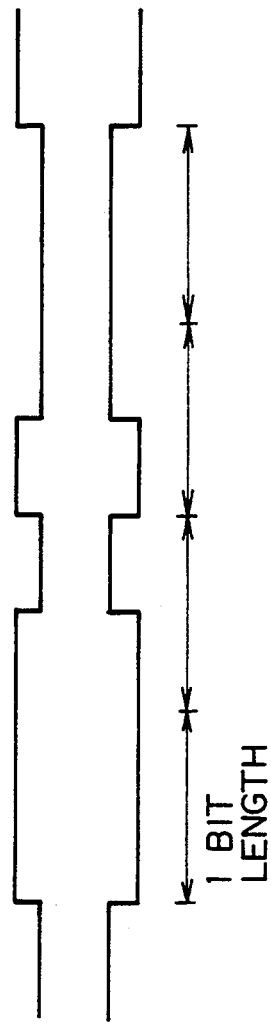
FIG. 15 is a typical view showing the construction of a synchronous pattern.

The synchronous pattern is represented by breaking the bifacial form and shows a delimitation of the respective data. Two kinds of synchronous patterns exist as shown in FIG. 15 in accordance with high and low voltage levels of an electric signal just before an electric signal indicative of this synchronous pattern.

FIG. 16 shows an example of real waveforms of the synchronous pattern.

A digital signal in the bifacial form is inputted to an integrated circuit (IC). The ATIP demodulating circuit 30 detects a clock signal for extracting ATIP data, the synchronous pattern, and the ATIP data from this one digital input signal. The clock signal for extracting ATIP data is used for take-in timing of these data and servo control of the CLV control circuit 40.

The basic construction of the ATIP demodulating circuit 30 is already described with reference to FIGS. 4a and 4b.

This ATIP demodulating circuit 30 will be further described in detail with reference to FIGS. 13 to 25.

The synchronous pattern is transmitted to a central processing unit (CPU) as an ATIP system frame synchronous timing signal having 75 Hz in frequency. Further, respective data of this synchronous pattern are transmitted to the central processing unit (CPU) as ATIP time information. A CRC operation is performed with respect to the ATIP time information and CRC data and the results of the CRC operation are transmitted to the central processing unit (CPU).

As shown in FIG. 17, in an operation of the ATIP demodulating circuit 30, two kinds of clock signals C3150 and C6300 are extracted from an ATIP input signal.

The desirable signal C3150 shows delimitations of the respective data. The signal C6300 is provided in a process for extracting this signal C3150. A edge signal is extracted from a waveform pattern of the ATIP input signal. The desirable signal C3150 is obtained by removing some signals from this edge signal and adding some signals to this edge signal.

Figure 18:
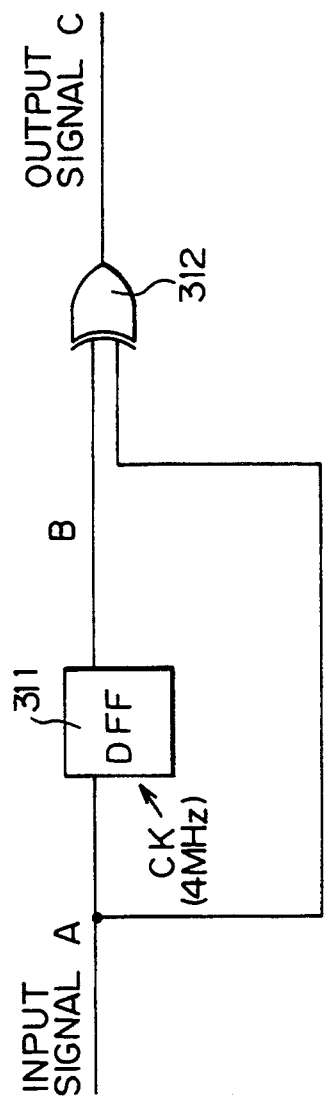
FIG. 18 is a circuit diagram showing one example of an edge detecting circuit of the ATIP signal.

The edge signal of the ATIP input signal is extracted by using an electric circuit as shown in FIG. 18. This electric circuit is constructed by a D-flip flop (DFF) circuit 311 using a basic clock signal and an exclusive OR circuit 312. In this embodiment, the basic clock signal is a system clock signal having 4 MHz in frequency.

Figure 19:
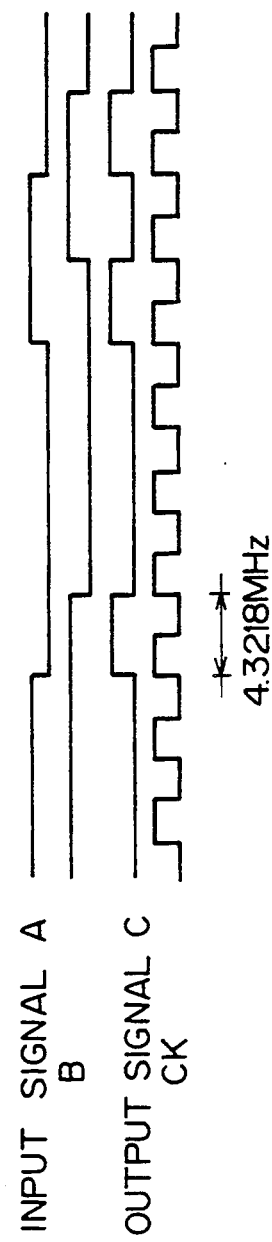
FIG. 19 is a waveform chart showing respective output signals of the edge detecting circuit of the ATIP signal.

As shown in FIGS. 18 and 19, an input signal A is inputted to the D-flip flop circuit 311 at the timing of a reference clock signal CK. This D-flip flop circuit 311 outputs an electric signal B provided by delaying the input signal A.

The exclusive OR circuit 312 performs an exclusive OR operation with respect to the input signal A and the output signal B and outputs an output signal C.

An edge extracting signal (DET) of the external ATIP input is basically set to the signal C3150. Windows A and B are set to exclude the edge extracting signal to be removed. Further, signal interpolation is performed to make an INS signal to be added. The edge extracting signal (DET) is a signal taken out of the optical disk 2 rotating by the motor. Accordingly, an interval of the edge extracting signal (DET) is changed in accordance with a rotational speed of this motor. Further, the interval of the edge extracting signal (DET) is changed by an irregular rotation of this motor, etc.

Figure 20:
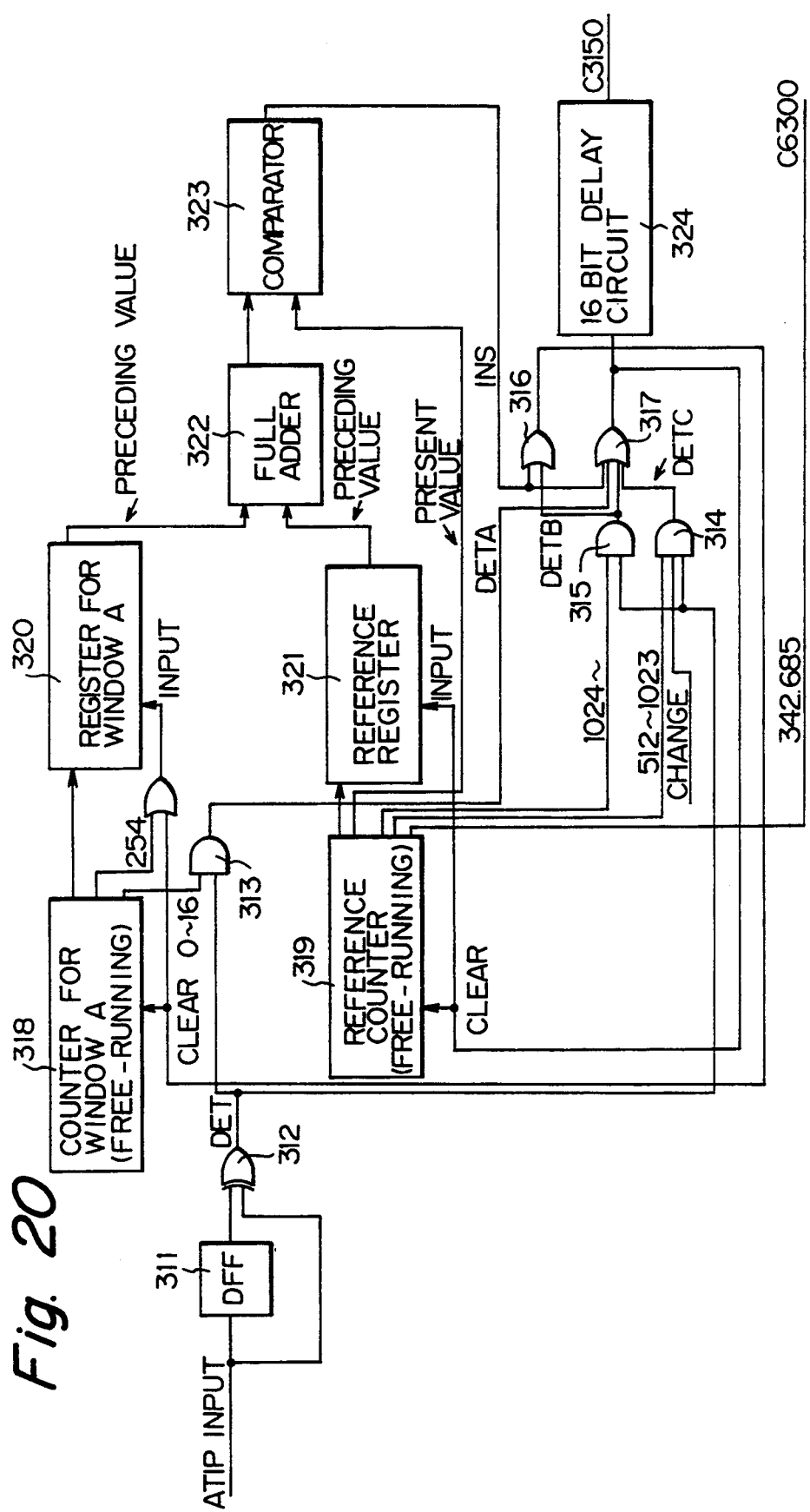
FIG. 20 is a block diagram showing a data processing circuit of the ATIP signal.

Accordingly, a reference counter 319, a reference register 321, a counter 318 for the window A, and a register 320 for the window A are disposed as shown in FIG. 20.

Figure 21:
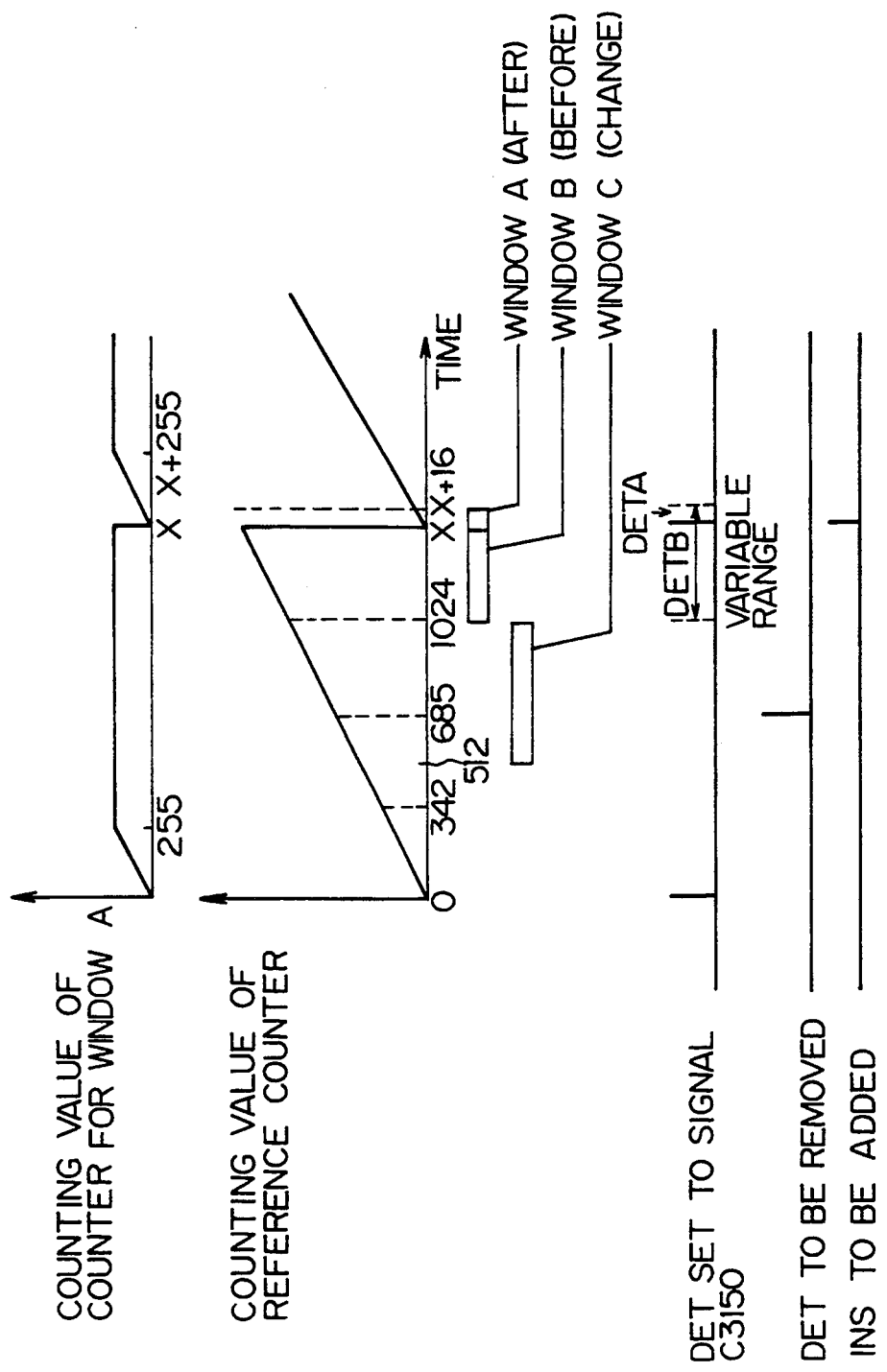
FIG. 21 is a waveform chart showing the relation between respective output signals in data processing of the ATIP signal.

A signal DETB is constructed by a portion of the edge extracting signal (DET) transmitted through the window B from the reference counter 119. A signal DETA is constructed by a portion of the edge extracting signal (DET) transmitted through the window A from the counter 318 for the window A. These signals DETA and DETB are set to the signal C3150 as they are. The signal C3150 is constructed by a periodic pulse having 3.15 KHz in frequency and shows lengths of the respective ATIP data. The signal 06300 is constructed by a periodic pulse having 6.30 KHz in frequency. If the optical disk 2 is correctly rotated, an interval of each of edge extracting signals is equal to an interval corresponding to 1372 clocks. As shown in FIG. 21, the number of 1372 clocks is counted during 3.15 KHz by 4.3218 MHz. In FIG. 21, the value of X is equal to a standard value 1371 as the preceding value, i.e., an output value of a full adder 322.

The INS signal is added when there is no edge extracting signal (DET) within the synchronous pattern, etc. and no optical disk is normally rotated. Otherwise, the INS signal is added when data are missing and no edge extracting signal (DET) can be found by a flaw on a surface of the optical disk.

A new signal C3150 is generated by the INS signal at the same interval as the preceding interval. Therefore, the preceding interval is stored to the reference register 321 and the register 320 for the window A. A comparator 323 compares the preceding interval with the present interval outputted from the reference counter 319 and outputs the INS signal when these preceding and present intervals are in conformity with each other.

If the DETB signal is generated, the respective counters 318 and 319 are cleared before the INS signal is generated. Accordingly, there is no INS signal in this case. In contrast to this, the DETA signal is generated after the INS signal is generated so that the INS signal is erased and the DETA signal is used. Therefore, the DETA signal has a width of 16 bits since it is impossible to increase a delay value of this signal.

A take-in timing of the register 320 for the window A is set in a range until 254. The edge extracting signal DET generated in this range is not equal to the DETA signal, but is used for the next comparison of the comparator.

Thus, the signals C3150 and C6300 are generated. The contents of CHANGE and WINDOW (see FIG. 21) will be described in detail later.

As shown in FIGS. 22 and 23, the bifacial form of the ATIP input data is returned to a normal form by using the signals C6300 and C3150 obtained above.

As shown in FIG. 23, an ATIP input signal is inputted to a shift register 351. The shift register 351 transmits an output Q1 by clocking this shift register by the signal C5300. Further, the shift register 351 transmits an output Q2 by clocking this shift register by the next signal C6300. An exclusive OR circuit 352 performs an exclusive OR operation with respect to these outputs Q1 and Q2 and outputs an ATSD signal. This ATSD signal from the exclusive OR circuit 352 is inputted to a serial-parallel register 353 at a timing of the signal C3150. A voltage value of this inputted ATSD signal is a normal value. The matching of a SYNC pattern is separately performed.

Figure 24:
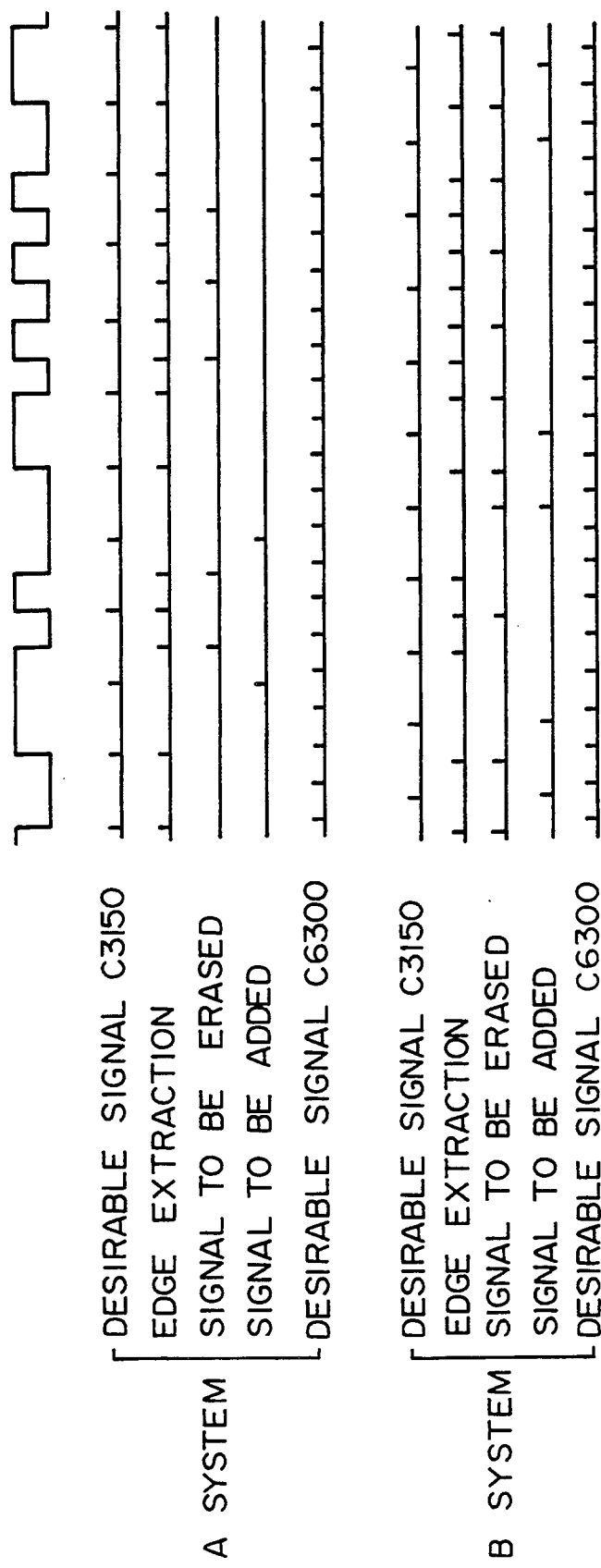
FIG. 24 is a waveform chart showing the relation between respective output signals in data processing of the ATIP signal.

In the above embodiment, the signal C3150 is formed in two kinds of methods as shown in FIG. 24. In such methods, after the signal C3150 is detected at a certain time point, signal interpolation is performed if there is no external signal C3150 (or no edge signal of the ATIP signal) at a time point of this signal C3150 to be next detected. The signal C3150 (or the edge signal of the ATIP signal) is neglected at a time point at which no signal C3150 is required. In such methods, after one of the window A and B systems is once selected, the one of the window A and B systems is maintained.

Figure 25:
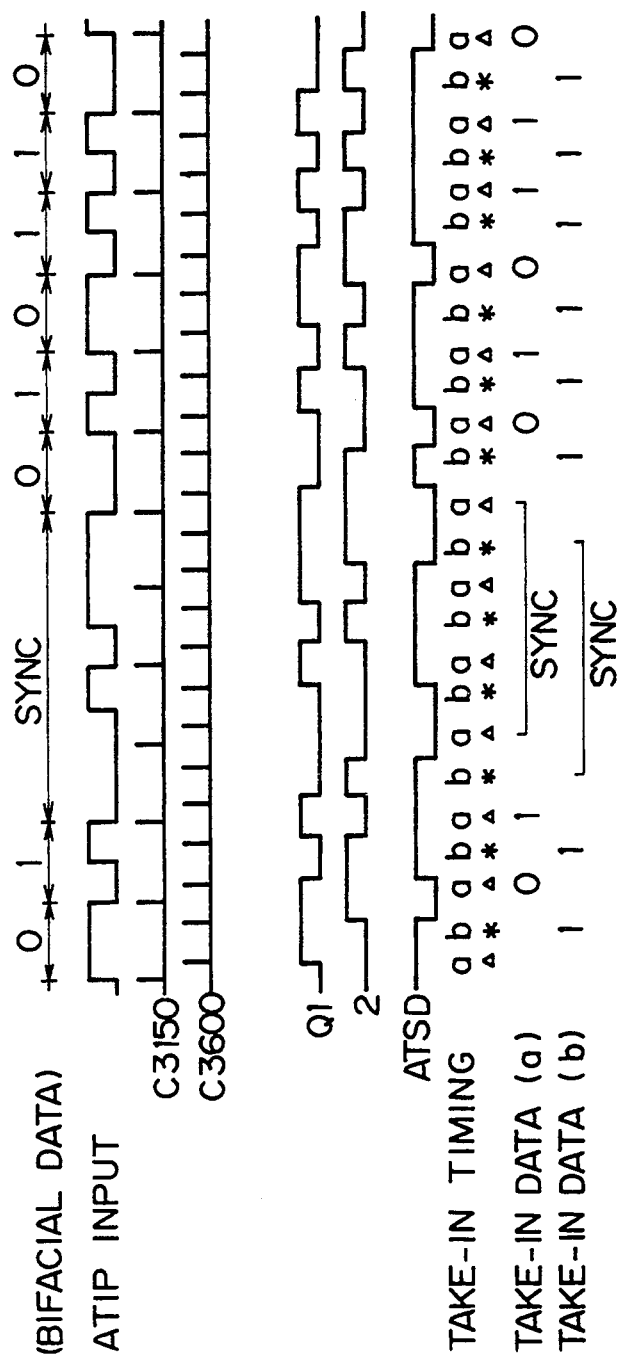
FIG. 25 is a waveform chart showing the relation between respective output signals in data processing of the ATIP signal.

There are two kinds of take-in timings of the ATSD signal at this time as shown by a(Δ) and b(*) in FIG. 25.

At this time, the timing a(Δ) of the window A system shows a correct timing series. In the case of the window B system, take-in data are used to return this window B system to the correct window A system. As shown in FIG. 25, all take-in data (b) show value "1" and the number of values "1" is counted. When this number of values "1" is clearly greater than a predetermined number, this window system is regarded as the window B system and a C3150 signal series is processed once again. With respect to the ATIP data, data ATIME are shown by minute, second and frame by a BCD display. Maximum values of the minute, second and frame are respectively equal to 99 minutes, 59 seconds and 75 frames shown by "10011001 01011001 01110101" using a binary notation. Accordingly, most significant bytes (MSBs) of the second and the frame show value "0"at any time so that the above processing about the C3150 signal series can be performed.

A CHANGE state is set when the number of values "1" with respect to the take-in data is equal to greater than the predetermined number. At this time, as shown in FIGS. 20 and 21, a new C3150 signal series begins to be processed by using the signal C3150 as an ATIP input edge signal found within a window C (see FIGS. 10, 11a and 11b).

(4a) The CLV control circuit 40 will be further described in detail with reference to FIGS. 5 and 26. This item (4a) corresponds to the above-mentioned (4).

A basic entire construction of the CLV control circuit 40 is already described with reference to FIG. 5.

In this CLV control circuit 40, the vol rage level of an MDS signal is set to a low voltage level or a high voltage level every one EFM frame. Namely, the voltage level of the MDS signal is set to the low or high voltage level in a certain EFM frame.

Figure 26:
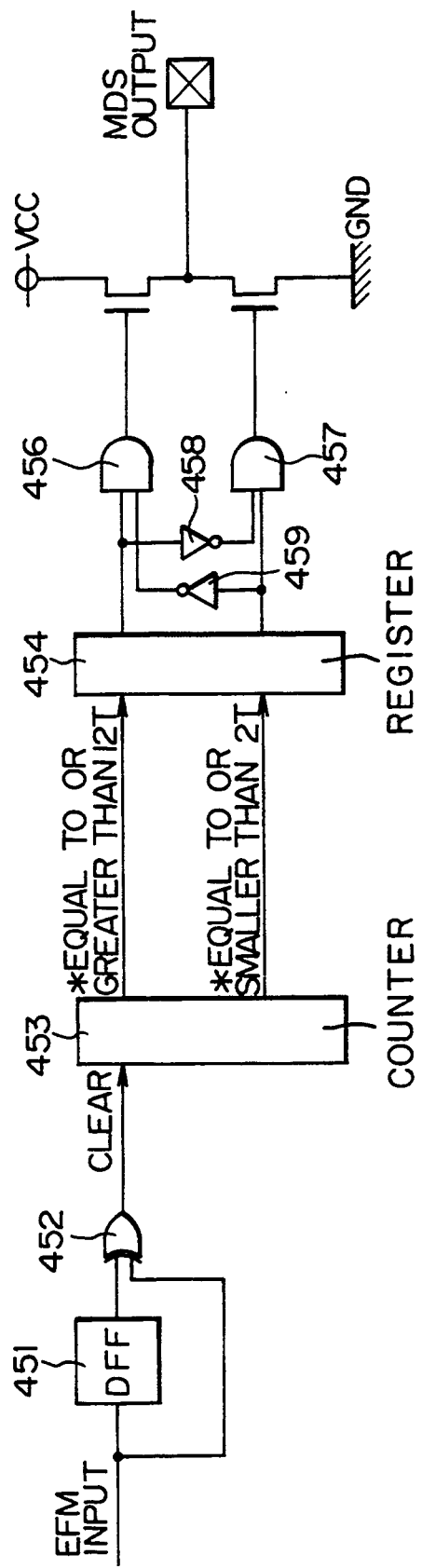
FIG. 26 is a block diagram showing an EFM pattern control portion of the CLV control circuit in the present invention.

FIG. 26 shows an EFM pattern servo portion for providing the MDS output signal as a signal for controlling the operation of a spindle motor. The operation of the CLV control circuit 40 will be next described in detail with reference to FIG. 26.

As mentioned above, in the EFM converting system, there is the "3T-11T rule" in which the length of a top or bottom of the EFM pattern must be three to eleven times a unit length.

When data are normally read out of an EFM pit of the optical disk 2, the optical disk is correctly formed. Accordingly, a shortest length of the top or bottom of the EFM pattern is equal to 3T and a longest length thereof is equal to 11T in accordance with the 3T-11T rule. If there is a top or bottom of the EFM pattern having a length equal to or smaller than 2T or there is a top or bottom of the EFM pattern having a length equal to or greater than 12T, such a length is provided by an increase or decrease in rotation of the optical disk unless such a length is provided by missing of information caused by a flaw on the optical disk, etc.

As shown in FIG. 26, the rotation of the optical disk is roughly adjusted by using such a relation between the length of the top or bottom of the EFM pattern and a rotational speed of the optical disk. In FIG. 26, the top or bottom an EFM pattern inputted to a D-flip flop circuit 451 is detected by an exclusive OR circuit 452. The length of this top or bottom is measured by performing the counting operation of a counter 453 using a reference clock signal (X'tal) having 4 MHz in frequency. When a length of the top or bottom equal to or greater than 12T, or a length of the top or bottom equal to or smaller than 2T is detected, data indicative of this length are outputted to a register 454 and the rotation of the spindle motor is adjusted in accordance with the following table 1.

TABLE 1

|   | equal to or greater than 12T | equal to or smaller than 2T | phenomenon | rotation of motor |
|---|---|---|---|---|
| A | existence | existence | regard as information missing | do nothing |
| B | existence | non-existence | low speed rotation | accelerate (MDS"H") |
| C | non-existence | existence | high speed rotation | decelerate (MDS"L") |
| D | non-existence | non-existence | normal | do nothing |

As mentioned above, in accordance with the present invention, it is possible to provide a controller for controlling the rotation of an optical disk of a write-once type and having a simplified structure. Further, since a circuit structure of the controller is simplified, it is possible to easily integrate electric circuits with each other in one chip.

The present invention has a circuit for processing a signal of the optical disk of a write-once type. This signal processing circuit has an extracting circuit for measuring a switching edge interval of the ATIP signal read out of the optical disk by using a reference clock signal, and extracting first and second clock signals; a shift register for storing the input ATIP signal in synchronization with the second clock signal; and a judging circuit for performing an exclusive OR operation with respect to first and second outputs provided by the second clock signal from the shift register, the judging circuit judging input or output of bifacial data. In this signal processing circuit, when two kinds of first clock signals are extracted from the extracting circuit and an incorrect first clock signal of the two first clock signals is extracted from the extracting circuit, the judging circuit returns the incorrect first clock signal to a correct clock signal.

Further, the present invention has a signal processing circuit for writing data to the optical disk of a write-once type. This signal processing circuit has memory means for storing the data written to the optical disk; nonvolatile memory means for storing respective predetermined parameter values corresponding to data read out of the memory means; non-volatile memory means for storing a usable pattern based on the parameter values; means for calculating a total digital counting value in a data unit; priority degree calculating means for calculating a priority degree of the pattern based on the total digital counting value in the data unit and calculated results of the calculating means; and means for selecting a single pattern to be outputted from an output of the memory means storing the pattern on the basis of an output of the priority degree calculating means.

Further, the present invention has a signal processing circuit for adding a margin bit to the data writ ten to the optical disk of a write-once type. This signal processing circuit has memory means for storing the data written to the optical disk; non-volatile memory means for storing a value provided by subtracting a value one from a length of data having the same value at an end thereof, a length value of data having the same value at a head thereof, and a total digital counting value in a data unit, in accordance with the data read out of the memory means; non-volatile memory means for storing a usable pattern based on the value provided by the subtraction and the length value of data having the same value at the head thereof; means for calculating the total digital counting value in the data unit; priority degree calculating means for calculating a priority degree of the pattern based on the total digital counting value in the data unit and calculated results of the calculating means; and means for selecting a single pattern to be outputted from an output of the memory means storing the pattern on the basis of an output of the priority degree calculating means.

In accordance with these structures of the present invention, it is possible to provide a so-called orange book standard for recording and reproducing data with respect to the compact disk of a write-once type and easily manufacture a recording/reproducing device of the compact disk of a write-once type.

Many widely different embodiments of the present invention may be constructed without departing from the spirit and scope of the present invention. It should be understood that the present invention is not limited to the specific embodiments described in the specification, except as defined in the appended claims.

What is claimed is:

1. A semiconductor integrated circuit for processing a signal of an optical disk of a write-once type, comprising:

an EFM demodulating circuit for demodulating an EFM-modulated EFM signal read from the optical disk;

an EFM modulating circuit for EFM-modulating data written on the optical disk;

an ATIP demodulating circuit for demodulating an ATIP signal read from the optical disk;

a CLV control circuit for outputting a signal for controlling rotation of the optical disk based on said EFM signal or said ATIP signal;

a subcode forming arithmetic circuit for performing a CRC operation with respect to the data to be written on the optical disk thereby to form a subcode and for extracting the subcode from said EFM signal and performing the CRC operation of the subcode;

a CIRC modulating/demodulating circuit for detecting and correcting an error in CIRC signal from said EFM-demodulated signal and adding a CIRC error correction Code to the data to be written on the optical disk;

an interface circuit for outputting and inputting an audio signal or data; and an interface circuit for interfacing with a data bus of a processor for an external system controller;

wherein the semiconductor integrated circuit further comprises a controller for controlling the rotation of the optical disk of the write-once type; said controller comprising:

means for measuring the length of a top or bottom of each signal pattern of a binary EFM input signal by using an internal reference clock signal;

means for judging whether or not the length of the top or bottom is three to eleven times a unit length; and motor control means for decelerating the rotation of the optical disk when a signal pattern having a top or bottom equal to or smaller than twice the unit length is detected by the judging means and accelerating the rotation of the optical disk when the signal pattern having a top or bottom equal to or greater than twelve times the unit length is detected by the judging means.

2. A semiconductor integrated circuit for processing a signal of an optical disk of a write-once type, comprising;

an EFM demodulating circuit for demodulating an EFM-modulated EFM signal read from the optical disk;

an EFM modulating circuit for EFM-modulating data written on the optical disk;

an ATIP demodulating circuit for demodulating an ATIP signal read from the optical disk;

a CLV control circuit for outputting a signal for controlling rotation of the optical disk based on said EFM signal or said ATIP signal;

a subcode forming arithmetic circuit for performing a CRC operation with respect to the data to be written on the optical disk thereby to form a subcode and for extracting the subcode from said EFM signal and performing the CRC operation of the subcode;

a CIRC modulating/demodulating circuit for detecting and correcting an error in CIRC signal from said EFM-demodulated signal and adding a CIRC error correction code to the data to be written on the optical disk;

an interface circuit for outputting and inputting an audio signal or data; and an interface circuit for interfacing with a data bus of a processor for an external system controller;

wherein the semiconductor integrated circuit further comprises a circuit for processing a signal of the optical disk of the write-once type; said signal processing circuit comprising:

an extracting circuit for measuring a switching edge interval of the ATIP signal read out of the optical disk by using a reference clock signal, and for extracting a first clock signal used for extracting the edge of the ATIP signal and a second clock signal used for storing the ATIP signal;

a shift register for storing the ATIP signal in synchronization with the extracted second clock signal; and a judging circuit for performing an exclusive OR operation with respect to first and second outputs from the shift register and correcting the first clock signal if it is incorrect.

3. A semiconductor integrated circuit for processing a signal of an optical disk of a write-once type, comprising:
- an EFM demodulating circuit for demodulating an EFM-modulated EFM signal read from the optical disk;
- an EFM modulating circuit for EFM-modulating data written on the optical disk;
- an ATIP demodulating circuit for demodulating an ATIP signal read from the optical disk;
- a CLV control circuit for outputting a signal for controlling rotation of the optical disk based on said EFM signal or said ATIP signal;
- a subcode forming arithmetic circuit for performing a CRC operation with respect to the data to be written on the optical disk thereby to form a subcode and for extracting the subcode from said EFM signal and performing the CRC operation of the subcode;
- a CIRC modulating/demodulating circuit for detecting and correcting an error in CIRC signal from said EFM-demodulated signal and adding a CIRC error correction code to the data to be written on the optical disk;
- an interface circuit for outputting and inputting an audio signal or data; and
- an interface circuit for interfacing with a data bus of a processor for an external system controller;
- wherein the semiconductor integrated circuit further comprises a signal processing circuit for writing data to the optical disk of the write-once type; said signal processing circuit comprising:
- memory means for storing the data written to the optical disk;
- first non-volatile memory means for storing respective predetermined parameter values corresponding to data read out of said memory means;
- second non-volatile memory means for storing a usable pattern based on the parameter values;
- means for calculating a total digital counting value;
- priority degree calculating means for calculating a priority degree of the pattern based on the total digital counting value calculated by said calculating means; and
- means for selecting a single pattern to be outputted from the second non-volatile memory means and storing said pattern on the basis of an output of the priority degree calculating means.

4. A semiconductor integrated circuit for processing a signal of an optical disk of a write-once type, comprising:
- an EFM demodulating circuit for demodulating an EFM-modulated EFM signal read from the optical disk;
- an EFM modulating Circuit for EFM-modulating data written on the optical disk;
- an ATIP demodulating circuit for demodulating an ATIP signal read from the optical disk;
- a CLV control circuit for outputting a signal for controlling rotation of the optical disk based on said EFM signal or said ATIP signal;
- a subcode forming arithmetic circuit for performing a CRC operation with respect to the data to be written on the optical disk thereby to form a subcode and for extracting the subcode from said EFM signal and performing the CRC operation of the subcode;
- a CIRC modulating/demodulating circuit for detecting and correcting an error in CIRC signal from said EFM-demodulated signal and adding a CIRC error correction code to the data to be written on the optical disk;
- an interface circuit for outputting and inputting an audio signal or data; and
- an interface circuit for interfacing with a data bus of a processor for an external system controller;
- wherein the semiconductor integrated circuit further comprises a signal processing circuit for adding a margin bit to the data written to the optical disk of the write-once type,
- said signal processing circuit including;
- memory means for storing the data written to the optical disk,
- first non-volatile memory means for storing a first value obtained by subtracting a value 1 from a length of data having the same value at an end thereof, a length value of data having the same value at a head thereof, and a total digital counting value in a data unit, in accordance with the data read out of said memory means,
- second non-volatile memory means for storing a usable pattern based on the first value and the length value of data having the same value at the head thereof,
- means for calculating the total digital counting value
- priority degree calculating means for calculating a priority degree of the pattern based on the total digital counting value calculated by said calculating means, and
- means for selecting a single pattern to be outputted from the memory means on the basis of an output of the priority degree calculating means.

5. A semiconductor device comprising:
- an EFM demodulating circuit for demodulating an EFM-modulated EFM signal read from an optical disk;
- an EFM modulating circuit for EFM-modulating data written to the optical disk;
- an ATIP demodulating circuit for demodulating an ATIP signal read from the optical disk;
- a CLV control circuit for outputting a signal for controlling rotation of the optical disk based on said EFM signal or said ATIP signal;
- a subcode forming arithmetic circuit for performing a CRC operation with respect to the data to be written on the optical disk thereby to form a subcode and for extracting the subcode from said EFM signal and performing the CRC operation of the subcode;
- a CIRC modulating/demodulating circuit for detecting and correcting an error in a CIRC signal form said EFM-demodulated signal and for adding a CIRC error correction code to the data written to the optical disk:
- an interface circuit for outputting and inputting an audio signal or data; and
- an interface circuit for interfacing with a data bus of a processor for an external system controller;
- said semiconductor device being constructed such that at least two of said EFM demodulating circuit, EFM modulating circuit, ATIP demodulating circuit, CLV control circuit, subcord forming arithmetic circuit, and CIRC modulating demodulating circuit are formed on the same semiconductor substrate;

wherein the semiconductor device further comprises a controller for controlling the rotation of the optical disk of a write-once type;

said controller comprising:

means for measuring the length of a top or bottom of each signal pattern of a binary EFM input signal by using an internal reference clock signal;

means for judging whether or not the length of the top or bottom is three to eleven times a unit length; and motor control means for decelerating the rotation of the optical disk when a signal pattern having a top and bottom equal to or smaller than twice the unit length is detected by the judging means and accelerating the rotation of the optical disk when the signal pattern having a top or bottom equal to or greater than twelve times the unit length is detected by the judging means.

6. A semiconductor device comprising:

an EFM demodulating circuit for demodulating an EFM-modulated EFM signal read from an optical disk;

an EFM modulating circuit for EFM-modulating data written to the optical disk;

an ATIP demodulating circuit for demodulating an ATIP signal read from the optical disk;

a CLV control circuit for outputting a signal for controlling rotation of the optical disk based on said EFM signal or said ATIP signal;

a subcode forming arithmetic circuit for performing a CRC operation with respect to the data to be written on the optical disk thereby to form a subcode and for extracting the subcode from said EFM signal and performing the CRC operation of the subcode;

a CIRC modulating/demodulating circuit for detecting and correcting an error in a CIRC signal form said EFM-demodulated signal and for adding a CIRC error correction code to the data written to the optical disk;

an interface circuit for outputting and inputting an audio signal or data; and an interface circuit for interfacing with a data bus of a processor for an external system controller;

said semiconductor device being constructed such that at least two of said EFM demodulating circuit, EFM modulating circuit, ATIP demodulating circuit, CLV control circuit, subcord forming arithmetic circuit, and CIRC modulating/demodulating circuit are formed on the same semiconductor substrate;

wherein the semiconductor device further comprises a circuit for processing a signal of the optical disk of a write-once type;

said signal processing circuit comprising:

an extracting circuit for measuring a switching edge interval of the ATIP signal read out of the optical disk by using a reference clock signal, and for extracting a first clock signal used for extracting the edge of the ATIP signal and a second clock signal used for storing the ATIP signal;

a shift register for storing the ATIP signal in synchronization with the extracted second clock signal; and a judging circuit for performing an exclusive OR operation with respect to first and second outputs from the shift register and correcting the first clock signal if it is incorrect, said first clock being used for extracting the edge of the ATIP signal.

7. A semiconductor device comprising:

an EFM demodulating circuit for demodulating an EFM-modulated EFM signal read from an optical disk;

an EFM modulating circuit for EFM-modulating data written to the optical disk;

an ATIP demodulating circuit for demodulating an ATIP signal read from the optical disk;

a CLV control circuit for outputting a signal for controlling rotation of the optical disk based on said EFM signal or said ATIP signal;

a subcode forming arithmetic circuit for performing a CRC operation with respect to the data to be written on the optical disk thereby to form a subcode and for extracting the subcode from said EFM signal and performing the CRC operation of the subcode;

a CIRC modulating/demodulating circuit for detecting and correcting an error in a CIRC signal form said EFM-demodulated signal and for adding a CIRC error correction code to the data written to the optical disk;

an interface circuit for outputting and inputting an audio signal or data; and an interface circuit for interfacing with a data bus of a processor for an external system controller;

said semiconductor device being constructed such that at least two of said EFM demodulating circuit EFM modulating circuit ATIP demodulating circuit, CLV control circuit, subcord forming arithmetic circuit, and CIRC modulating/demodulating circuit are formed on the same semiconductor substrate;

wherein the semiconductor device further comprises a signal processing circuit for writing data to the optical disk of a write-once type;

said signal processing circuit comprising:

memory means for storing the data written to the optical disk, first non-volatile memory means for storing respective predetermined parameter values corresponding to data read out of said memory means, second non-volatile memory means for storing a usable pattern based on the parameter values, means for calculating a total digital counting value;

priority degree calculating means for calculating a priority degree of the pattern based on the total digital counting value calculated by said calculating means; and means for selecting a single pattern to be outputted from the second non-volatile memory means and storing said pattern on the basis of an output of the priority degree calculating means.

8. A semiconductor device comprising:

an EFM demodulating circuit for demodulating an EFM-modulated EFM signal read from an optical disk;

an EFM modulating circuit for EFM-modulating data written to the optical disk;

an ATIP demodulating circuit for demodulating an ATIP signal read from the optical disk;

a CLV control circuit for outputting a signal for controlling rotation of the optical disk based on said EFM signal or said ATIP signal;

subcode forming arithmetic circuit for performing a CRC operation with respect to the data to be written on the optical disk thereby to form a subcode and for extracting the subcode from said EFM signal and performing the CRC operation of the subcode;

a CIRC modulating/demodulating circuit for detecting and correcting an error in a CIRC signal form said EFM-demodulated signal and for adding a CIRC error correction code to the data written to the optical disk;

an interface circuit for outputting and inputting an audio signal or data; and an interface circuit for interfacing with a data bus of a processor for an external system controller;

said semiconductor device being constructed such that at least two of said EFM demodulating circuit, EFM modulating circuit, ATIP demodulating circuit, CLV control circuit, subcord forming arithmetic circuit, and CIRC modulating/demodulating circuit are formed on the same semiconductor substrate;

wherein the semiconductor device further comprises a signal processing circuit for adding a margin bit to the data written to the optical disk of a write-once type;

said signal processing circuit comprising:

memory means for storing the data written to the optical disk, first non-volatile memory means for storing a first value obtained by subtracting a value 1 from a length of data having the same value at an end thereof, a length value of data having the same value at a head thereof, and a total digital counting value in a data unit, in accordance with the data read out of said memory means, second non-volatile memory means for storing a usable pattern based on the first value and the length value of data having the same value at the head thereof, means for calculating the total digital counting value;

priority degree calculating means for calculating a priority degree of the pattern based on the total digital counting value calculated by said calculating means, and means for selecting a single pattern to be outputted from the memory means on the basis of an output of the priority degree calculating means.

* * * * *